(12) United States Patent
Viollet et al.

(10) Patent No.: US 10,161,741 B2
(45) Date of Patent: Dec. 25, 2018

(54) SYSTEM FOR DETECTING A CONTRASTED TARGET

(71) Applicants: CENTRE NATIONAL DE LA RECHERCHE SCIENTIFIQUE, Paris (FR); UNIVERSITÉ D'AIX-MARSEILLE, Marseille (FR)

(72) Inventors: Stephane Viollet, Ceyreste (FR); Franck Ruffier, Marseille (FR); Augustin Manecy, Moissac (FR); Julien Diperi, Vitrolles (FR)

(73) Assignees: CENTRE NATIONAL DE LA RECHERCHE SCIENTIFIQUE, Paris (FR); UNIVERSITÉ D'AIX-MARSEILLE, Marseilles (FR)

( * ) Notice: Subject to any disclaimer, the term of this patent is extended or adjusted under 35 U.S.C. 154(b) by 0 days.

(21) Appl. No.: 15/572,039

(22) PCT Filed: May 4, 2016

(86) PCT No.: PCT/EP2016/059999
§ 371 (c)(1),
(2) Date: Nov. 6, 2017

(87) PCT Pub. No.: WO2016/177781
PCT Pub. Date: Nov. 10, 2016

(65) Prior Publication Data
US 2018/0120091 A1 May 3, 2018

(30) Foreign Application Priority Data

May 6, 2015 (FR) .................................. 15 54051

(51) Int. Cl.
G01B 11/02 (2006.01)
G01B 11/00 (2006.01)
(Continued)

(52) U.S. Cl.
CPC .......... *G01B 11/028* (2013.01); *A63H 27/12* (2013.01); *G01B 11/002* (2013.01); *G01C 11/00* (2013.01);
(Continued)

(58) Field of Classification Search
CPC ..... G01B 11/028; G01B 11/002; G01B 11/02; G01B 11/022; G01B 11/024;
(Continued)

(56) References Cited

U.S. PATENT DOCUMENTS

| 2007/0216910 | A1* | 9/2007 | Franceschini | G01B 11/028 356/498 |
| 2009/0127430 | A1 | 5/2009 | Hirasawa et al. | |
| 2012/0310451 | A1* | 12/2012 | Kerhuel | G01P 3/68 701/3 |

FOREIGN PATENT DOCUMENTS

WO 2005/111536 11/2005

OTHER PUBLICATIONS

Written Opinion of the International Search Report for corresponding International PCT Application No. PCT/EP2016/059999, pp. 1-5.
(Continued)

*Primary Examiner* — Tarifur Chowdhury
*Assistant Examiner* — Jonathon Cook
(74) *Attorney, Agent, or Firm* — Hauptman Ham, LLP

(57) ABSTRACT

A method and a system for the optical detection, with hyperacuity, of a contrasted target, allowing the detection of the relative position of said target in relation to said detection system and therefore the acquisition and the pursuit of such a target. One or more embodiments is applicable to the field of autonomous robotic systems, especially for the positioning of drones or robots on a target.

25 Claims, 16 Drawing Sheets

(51) Int. Cl.
*G01S 3/782* (2006.01)
*G01S 5/16* (2006.01)
*A63H 27/00* (2006.01)
*G05D 1/02* (2006.01)
*G05D 1/10* (2006.01)
*H04N 9/04* (2006.01)
*G01C 11/00* (2006.01)
*G06K 9/32* (2006.01)
*G06K 9/00* (2006.01)

(52) U.S. Cl.
CPC ............... *G01S 3/782* (2013.01); *G01S 5/16* (2013.01); *G05D 1/0234* (2013.01); *G05D 1/102* (2013.01); *G06K 9/3241* (2013.01); *H04N 9/045* (2013.01); *G06K 9/0063* (2013.01)

(58) Field of Classification Search
CPC ...... G01B 11/026; G01C 11/00; A63H 27/12; G01S 3/782; G01S 5/16; G01S 17/06; G01S 17/46; G01S 17/66; G05D 1/0234; G05D 1/102; G06K 9/3241; G06K 9/0063; H04N 9/045; G01D 5/34; G01D 5/341
USPC ................ 356/498, 614, 615, 620, 621, 623
See application file for complete search history.

(56) References Cited

OTHER PUBLICATIONS

Colonnier, Fabien, et al., "A small-scale hyperacute compound eye featuring active eye tremor: application to visual stabilization, target tracking, and short-range odometry", Bioinspiration & Biomimetics, XP020282554, Feb. 25, 2015, Marseille, France, pp. 1-19.

Roubieu, Frederic L., et al., "A novel I-gram insect based device measuring visual motion along 5 optical directions", XP032093358, 2011, pp. 1-4.

Mura, F, et al., "Obstacle avoidance in a terrestrial mobile robot provided with a scanning retina", XP010209708, Marseille, France, pp. 1-6.

* cited by examiner

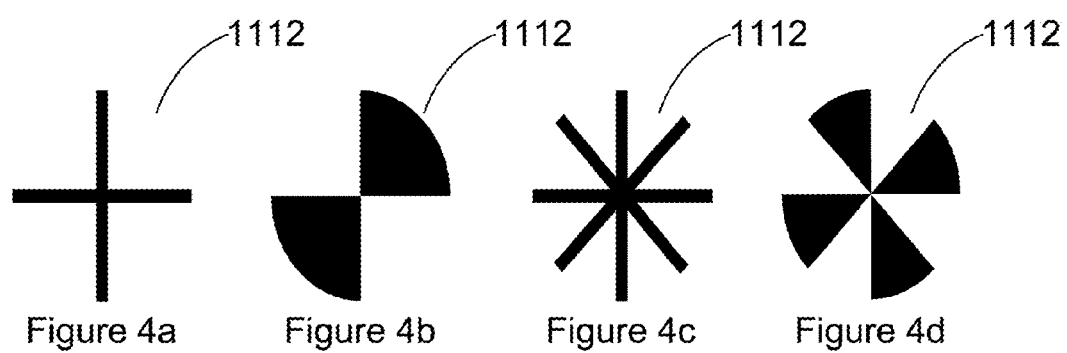
Figure 4a  Figure 4b  Figure 4c  Figure 4d
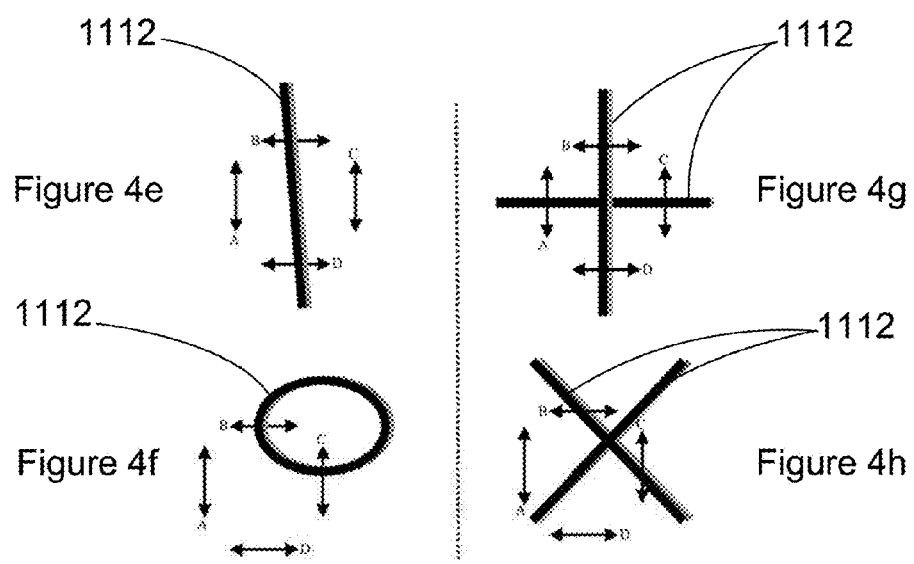
Figure 4e  Figure 4g
Figure 4f  Figure 4h

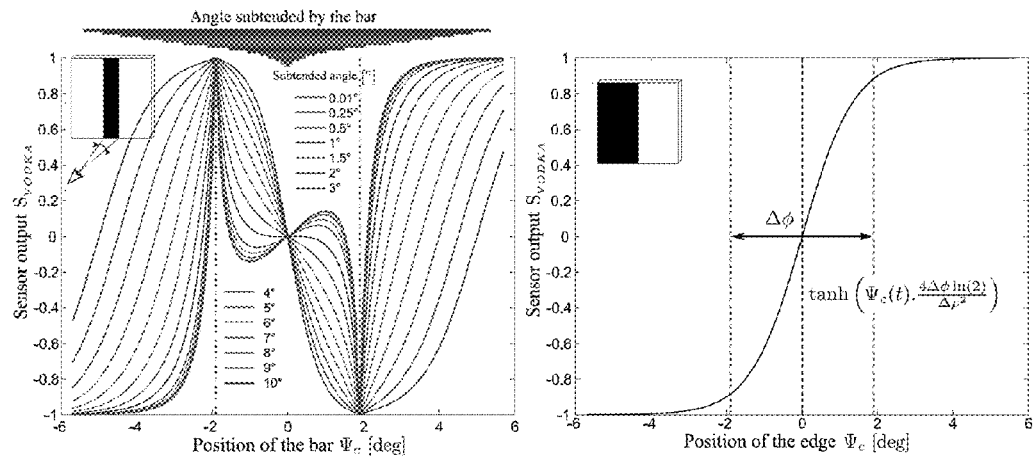
Figure 7e  Figure 7f
Figure 7g
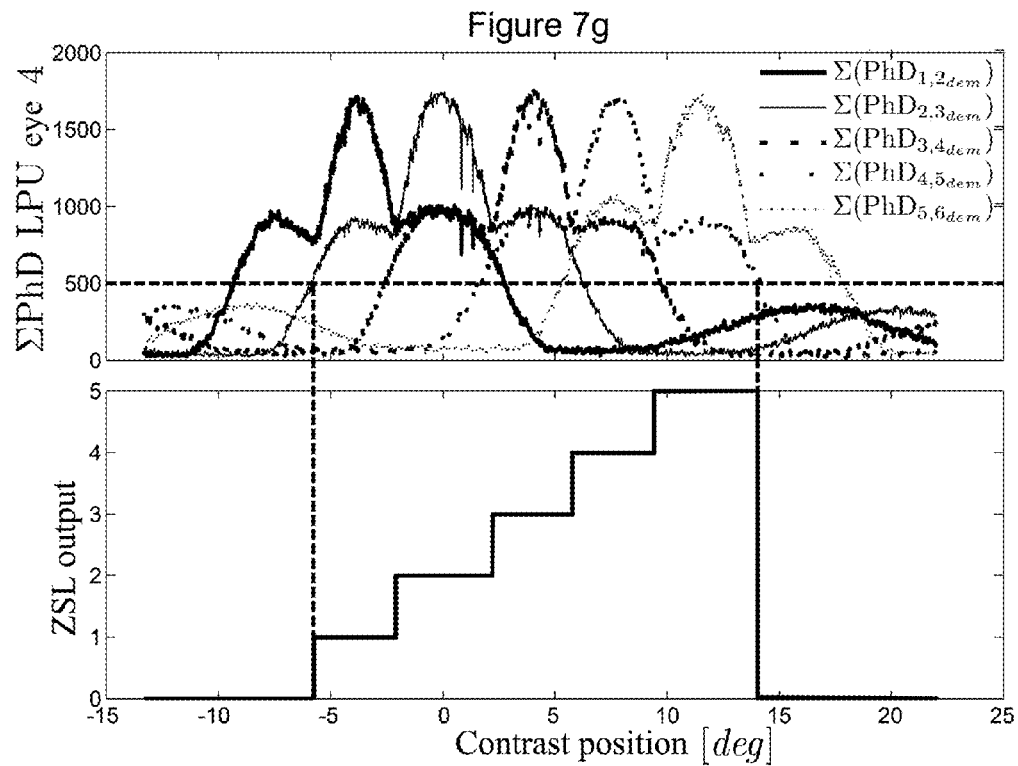
Figure 7h

SYSTEM FOR DETECTING A CONTRASTED TARGET

TECHNICAL FIELD OF THE INVENTION

This invention relates to a method and system for detecting (in hyperacuity) a contrasted target and a system for acquiring and pursuing such a target. It receives for particularly advantageous application the positioning of drones or robots on a target.

STATE OF THE ART

Optical acquisition is an essential element in the development of modern robotics. The interest today is not only to have robots in factories to perform repetitive tasks but to have robots outdoors that can move autonomously and perform specific tasks.

It is therefore necessary for the robot to be able to situate itself very precisely in the environment in which it is moving. For this purpose, having an image acquisition system available is essential for the future development of robotics.

In addition this visual acquisition must be as precise as possible, a solution that makes it possible to obtain an image sensor with very high resolution consists in associating a high-density sensor of photosensitive cells with suitable optics. In addition to a substantial size, this solution has a very high cost and requires a relatively large amount of computational power for processing the signals provided by this large number of photosensitive cells. In addition such a system relies on the high resolution of its sensor, and the loss of certain photosensitive cells would very quickly result in a malfunction of the system.

Another solution consists in moving an image sensor with microstep displacement, sub-multiples of the spacing between the photosensitive cells of the latter, and in reconstructing a final image from the partial images acquired at each micro-displacement. Such a solution involves the use of a high-capacity storage memory, as well as a particularly powerful image reconstruction algorithm, and therefore expensive in terms of time and computational resources. Other experimental systems have also been proposed. This type of system uses a CCD sensor and an image processing algorithm to extract the horizon with suitable precision. However, such a system requires a high luminance and requires substantial computing power, which further limits its utility for autonomous systems.

More recently, a technique for detection by an electronic eye, subjected to relative translation by the scanning optics of the device relative to the target allows for the detection of a substantially straight contrasted edge. This type of sensor makes it possible to determine the angular position of a contrast having a substantially straight edge, by means of two spatially offset photosensitive cells, on which a translational scanning is imposed. Such a technique is described in WO2005/111536 A1. Such a sensor carries out a detection in one direction only, in one dimension. One-dimensional localisation is limiting for an autonomous system moving outdoors in a three-dimensional environment. In addition the implementation of these solutions for two-dimensional scanning is complex, expensive in terms of energy and volume.

This invention has for objective to propose a solution that does not have the aforementioned disadvantages and which allows for an identification at least in two dimensions of a contrasted target.

SUMMARY OF THE INVENTION

According to a first aspect, this invention relates to a system for detecting a contrasted target that has at least one substantially straight area of contrast in at least one determined said system for detecting is characterised in that:
it comprises at least a first and a second optical devices, called eye, with each one comprising:
at least one optics having a focal plane and an optical axis perpendicular to the focal plane thereof and passing through an optical center and
at least one optical sensor comprising at least one plurality of photosensitive cells; said at least one plurality of photosensitive cells is positioned with respect to said at least one optics so that the light rays, preferably all of the light rays, transmitted by said at least one optics are received by said at least one plurality of photosensitive cells;
the optics of first and second optical devices are integral with each other and are supported by a first support;
the at least one optical sensor are integral with each other and are supported by a second support;
the first support and the second support are configured, to be driven in relative rotation with respect to one another.
said relative rotation is performed about an axis of rotation parallel to the optical axis of each one of the at least one optics, with the axis of rotation being different from the optical axis of each of the at least one optics;
at least one actuator and preferably an unique actuator is configured to generate said relative rotation;
the scanning angle of said relative rotation and the distance between the optical center of at least one optics of each eye and the axis of rotation of said relative rotation are configured so that for each one of at least two optical sensors, as said rotation takes place, the optical center of the optics associated with the optical sensor scans, i.e. visually reviews each one successively, a plurality of photosensitive cells of the optical sensor;
the at least two eyes are positioned with respect to said axis of rotation so that said scanning of the optical center of the at least one optics is performed in a first direction for the at least one first eye and in a second direction different from the first direction, for the at least one second eye.

Thus, this detection system allows for an at least two-dimensional detection of a two-dimensional contrasted target. Advantageously, the mechanical decoupling of the two supports allows for the setting in motion of one with respect to the other so as to perform a scanning of the photosensitive cells by the optical center of the optics.

The optical sensors of the eyes being integral and comprised by the second support, and the optics of the eyes also being integral with and comprised by the first support, the relative movement of the first support with respect to the second support implies a relative movement of the optics with respect to the optical sensors.

As this relative movement is preferably a relative rotation between a first support comprising the optics and a second support comprising the optical sensors, this results in an optical scanning of the optical center of the optics in different directions for each one of the eyes of the detection system.

As such all or at least most of periodical rotation is used to scan the sensors. The working duration of the sensors is thus optimised for each oscillating movement.

Advantageously, the eyes of this invention are not arranged on the same line passing through the center of rotation. As such the relative rotation of the optics with respect to the optical sensors consists of an optical scanning along at least two different directions allowing for a two-dimensional optical scanning.

Preferably, but in a non-mandatory manner, the eyes are arranged on the same circle centerd on the center of rotation.

Advantageously, an unique actuator, common to at least two eyes, is configured to generate said rotation.

The use of an unique actuator makes it possible to increase the mechanical reliability of the device, its compactness, reduce the energy consumption thereof and make the relative movement of the optics perfectly synchronized with respect to the optical sensors.

Consequently, the invention avoids having to use a complex system for synchronising the movements of the sensors that perform scans in different directions.

According to another aspect, this invention relates to a mobile device in at least two spatial directions comprising a detection system according to this invention and configured to adjust its position along at least two spatial directions according to a detection made by said detection system. Advantageously, the at least two spatial directions are mutually orthogonal.

This invention allows such a device to move in the at least two directions depending on its relative position with respect to a contrasted target using the detection system of this invention.

Another aspect of this invention relates to a drone comprising at least a detection system according to this invention and configured to adjust its spatial position according to a detection performed by said detection system.

Advantageously, this invention applies to flying devices of the drone type configured to move in three dimensions according to their position with respect to a contrasted target. The small size of this invention, as well as its low energy consumption provide considerable advantages for autonomous flying vehicles of the drone type.

Another aspect of this invention relates to a mobile robot comprising at least a detection system according to this invention and configured to adjust its spatial position according to a detection made by said detection system.

Advantageously, this invention applies to mobile robots of the motorised robot type provided with tracks for example configured to move in two dimensions based on their relative position with regards to a contrasted target. The small size of this invention, as well as its low energy consumption provide considerable advantages for autonomous vehicles of this type.

Another aspect of this invention relates to an assembly comprising at least one device, or a drone, or a robot according to this invention, and at least one contrast target, with the device, or the drone, or the robot being configured to adjust its spatial position depending on its relative position with respect to the contrasted target detected by said system.

Advantageously, the contrasted target serves as landmark to the device so that it can be guided from its relative position with respect to the contrasted target calculated by the detection system.

According to another aspect, this invention relates to a method for calibrating a detection system according to this invention, with respect to a contrasted target comprising at least one contrast, said method being characterised in that it comprises the following steps implemented by computer:

according to an optional embodiment, calculating a standardised output signal from each photosensitive cell for each optical device;

Selecting for each optical device, a pair of adjacent photosensitive cells whose output signal S, preferably standardised, is maximum with respect to the output signal S of the other pairs of adjacent photosensitive cells of the optical device;

Filtering the output signal S of each pair of photosensitive cells for each optical device, according to an optional embodiment, according to the maximum output signal S selected;

and in that it comprises the following steps:

For a plurality of known positions of the detection system with respect to the contrast, recording of said known position and the filtered output signal S of each pair of photosensitive cells for each optical device corresponding to said known position.

Generation of a table of correspondence between the known position of the detection system with respect to the contrast and the filtered output signal S of each pair of photosensitive cells for each optical device corresponding to said known position.

According to another aspect, this invention relates to a method for calibrating a detection system according to this invention, with respect to a contrasted target comprising at least one contrast, said method comprising the following steps implemented by computer:

Determining a plurality of pairs of adjacent photosensitive cells for each optical device;

Filtering of an output signal S of each one of said pairs of photosensitive cells;

the method also comprising the following steps:

For a plurality of known positions of the detection system with respect to the contrast, recording of said known position and the filtered output signal S out of each pair of photosensitive cells corresponding to said known position, i.e. obtained for said known position.

Generating a table of correspondence between the known position of the detection system with respect to the contrast and the filtered output signal S of each pair of photosensitive cells corresponding to said known position.

The method of calibration advantageously makes it possible to not depend on the intrinsic configuration of the photosensitive cells and to create a table of correspondence for each eye according to each target. This table of correspondence allows for a substantial increase in the detection acuity of this invention.

Advantageously, in this method of calibration, all pairs of adjacent photosensitive cells for each optical device are taken into account in the step of selecting the pair of adjacent photosensitive cells of which the output signal S, preferably standardised, is maximum with respect to the output signal S out of the other pairs of adjacent photosensitive cells of the optical device.

According to another aspect, this invention relates to a method for determining the position of a detection system according to this invention, with respect to a contrasted target comprising a contrast, by using a table of correspondence generated by the method of calibration according to this invention, characterised in that it comprises the following steps implemented by computer:

Measuring the filtered output signal S of each pair of photosensitive cells for each optical device;

Reading in the correspondence table of the position of the detection system with respect to the contrast corresponding to said filtered and measured signal S.

The use of a correspondence table makes it possible to increase the reliability of this invention in determining the position of the detection system with respect to a contrasted target.

According to another aspect, this invention also relates to a method for determining the position of a detection system according to this invention, with respect to a contrasted target comprising a contrast, by using a table of correspondence generated by the method of calibration according to this invention, with the method comprising the following steps implemented by computer:
Determining a plurality of pairs of adjacent photosensitive cells for each optical device;
Filtering of an output signal S of each one of said pairs of the plurality of pairs of adjacent photosensitive cells;
with the method also comprising the following steps:
Measuring of a filtered output signal S of each one of said pairs of the plurality of pairs of adjacent photosensitive cells;
Reading in the correspondence table of the position of the detection system with respect to the contrast corresponding to said filtered and measured signal S.

According to another aspect, this invention relates to a method for determining the relative angular position of a device or of a drone or of a robot, according to this invention, with respect to a contrasted target, said method being characterised in that it comprises the following steps:
determining the yaw angle by using all optical devices having in their field of vision the contrasted target;
determining a first optical device identified as being the best aligned with the contrasted target;
determining of pitch and roll angles using the optical devices capable of detecting the contrasted target in different spatial directions from that of said determined first optical device.

This method makes it possible to determine the relative position coordinates of the detection system with respect to a contrasted target. From these coordinates, the device comprising this detection system can adjust its position according to its internal programming parameters so as to be able, for example, be positioned in a particular manner with respect to the contrasted target.

BRIEF DESCRIPTION OF THE FIGURES

The purposes, objects and characteristics and advantages of the invention become apparent from the detailed description of an embodiment thereof which is shown by the following accompanying drawings in which:

FIGS. 4a to 4k show examples of contrasted targets and optical scans of this type of target.

Figure 1A:
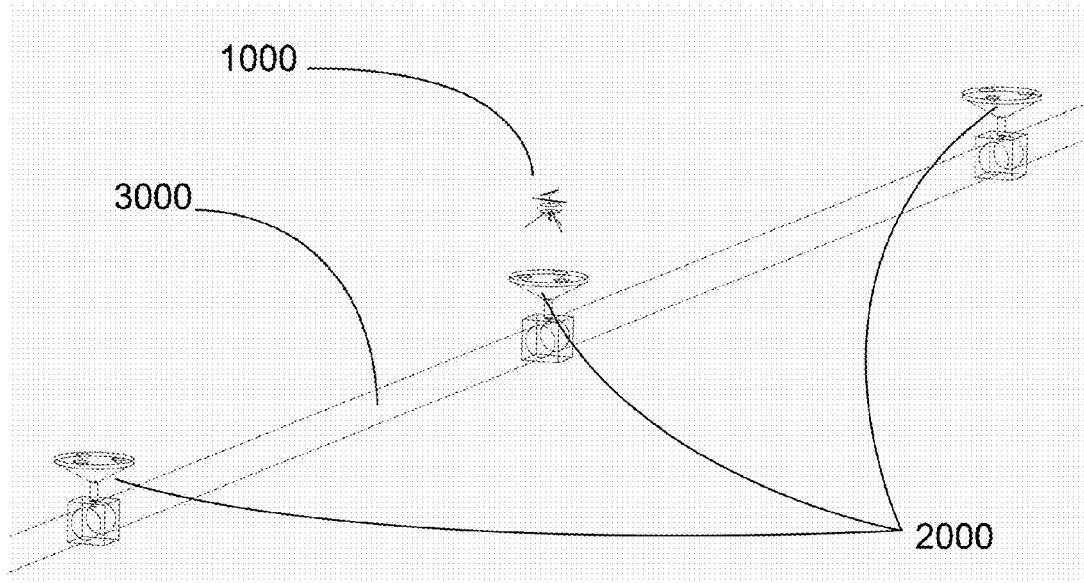
FIG. 1a shows the situation of an autonomous drone inspecting for example a pipeline comprising charging stations by induction.

The drawings are given as examples and are not limiting of the invention. They are diagrammatical block illustrations intended to facilitate the understanding of the invention and are not necessarily to scale of practical applications.

DETAILED DESCRIPTION OF THE INVENTION

Before going into the detail of preferred embodiments in particular with reference to the figures, various options are mentioned hereinafter that the invention may preferably but not exclusively have, with these options able to be implemented, either separately, or following any combination of them:

Advantageously, this invention is configured so that said relative rotation comprises an oscillatory rotational movement that is preferably periodic.

This periodic oscillating movement makes it possible to modulate the illumination, the scanning of the photosensitive cells so as to generate a modulated signal at the output of optical sensors that is proper to each photosensitive cell. This modulation as such makes it possible to reduce measurement noise. In addition this periodic oscillation ensures repeated measurement and thus more accuracy of the target located in the field of vision of each eye, i.e. of each of the optical devices.

Advantageously, the dimensions and configuration of the optical devices, in particular the size of the photosensitive cells and the distance between the axis of relative rotation and the optical center of the at least one optics are configured so that each optical sensor perceives the scanning as a translational movement.

This perception of relative translational movement makes its possible to define a precise scanning direction in a three-dimensional space.

Advantageously, this invention is configured so that the relationship which links the distance R between said axis of relative rotation and the optical center of the at least one optics, with the distance d' travelled by the optical center and with the distance d separating two adjacent photosensitive cells of the plurality of photosensitive cells, during scanning of an optical sensor by said optical center is expressed by the following equation:

$$d' = R\tan\left(\frac{d}{R}\right)$$

And wherein R>>d, advantageously R>k·d with k=10 and preferably k=100, so that d'≈d.

Thus the amplitude of the scan is very low compared to the distance between the center of rotation of this sweep. Thus, at each sensor, this periodic oscillating movement of rotation can be approximated by a periodic oscillating translation.

Advantageously, the ratio between:
the length of the radius defined by the distance between the center of rotation of the detection system about said axis of rotation to the optical center of the at least one optics and
the length of the optical sensor associated with said optical device, the length being measured along a direction perpendicular to a line passing through the axis of rotation and through a center of the optical sensor; is greater than 10 and preferably greater than 100.

Thus the length of a sensor is small compared with the radius of the detection system. This allows each optical sensor to perceive the rotational movement as a translation movement.

Advantageously, the actuator is an eccentric motor configured to generate said relative rotation comprising an oscillating rotational movement this is preferably periodic.

This makes it possible to generate a periodic oscillating motion using an unique actuator and having it function without making round trips. Typically a motor is used of which the output shaft rotates in one direction and which is coupled to an eccentric device for converting the continuous rotation of the motor output shaft for generating an oscillating rotational movement.

Therefore, the wear of the actuator is reduced and its operating longevity is increased.

Moreover, the use of an unique actuator ensures synchronicity of the scans between all the eyes of the same detection system.

Advantageously, for at least one optical device, the plurality of photosensitive cells is positioned outside the focal plane of the at least one optics.

As such, the at least one plurality of photosensitive cells is not positioned in the focal plane of the at least one optics.

This makes it possible to generate a Gaussian blur and allow spatial filtering so as to eliminate the finest details.

Advantageously, this invention is configured so that the light rays received by the plurality of photosensitive cells have a Gaussian distribution of their light intensity.

This Gaussian distribution of light intensity enables spatial filtering so as to be less sensitive to the finest details.

Advantageously, the optical devices are distributed around a circle or a ring centerd on the axis of rotation.

The ring configuration of the detection system of this invention makes it possible to have any type of equipment at the center of the optical detection system.

Advantageously, the system includes a video recording device positioned at the center of the circle or disk on which the optical devices are distributed.

The ring configuration of the detection system of this invention allows for a high-resolution camera at the center in such a way as to be able to perform precise tasks with the detection system and other precise tasks with the high-resolution camera.

Advantageously, the number of optical devices is between 1 and 1000, advantageously between 2 and 500, and preferably equal to 4, and wherein the optical devices are uniformly distributed around a circle of which the center is the axis of rotation of said rotation.

This allows for optical scans along different directions so as to perform two-dimensional scanning once the signals from each eye are merged.

Advantageously, the angle formed by a first straight line passing through the optical center of a first optical device and the center of rotation and by a second straight line passing through the optical center of a second optical device and the center of rotation is greater than 45°. This angle is preferably substantially equal to 90°. Thus, the at least two eyes are configured so that said scanning of the optical center of the optics is made according to two substantially perpendicular directions.

The optics associated with each sensor is typically a lens.

Advantageously, when the number of optical devices is equal to 2, these are distributed around a circle of which the center is the rotation axis of said rotation, with an angular separation between each optical device of between 0° and 360°, advantageously between 45° and 270°, and preferably equal to 90°.

The positioning at 90° from the second optical device in the case of two eyes optimises the acuity of the detector since as such the angular difference between the two swept directions is maximum, i.e. the scanning is performed in two perpendicular directions, allowing for a better assessment of the target.

Advantageously, all the photosensitive cells of the optical devices are scanned.

This maximization of the number of scanned photosensitive cells allows for an increase in the accuracy of the optical measurement.

Preferably, the optics of the optical devices are integral with each other and are included in the same first plane.

Preferably, said sensors of the optical devices are secured to each other and are supported by the second support being in the same second plane.

Advantageously, the scanning angle and the distance between the optical center of the at least one optics of each eye and the axis of rotation of said relative rotation are shaped so that for each one of at least two optical sensors, as said rotation takes place, the optical center of each one of the at least one optics performs a successive scan, characterised by a scanning angle, of the at least one plurality of photosensitive cells of each one of the at least two optical sensors.

Advantageously, the at least two eyes are configured so that said scanning of the optical center of the at least one optics is performed in a first direction for the at least one first eye and in a second direction, different from the first direction, for the at least one second eye.

Advantageously, a distance separates the axis of rotation from the optical axes.

This distance allows for a scanning of the optical sensors by the lenses by simple rotation of the lens holder about the axis of rotation of the detection system.

Advantageously, the number of photosensitive cells included in each of the at least one optical sensor is between 1 and 1000, advantageously between 2 and 500, and preferably equal to 5.

The greater the number of photosensitive cells is, the greater the measurement accuracy is.

Advantageously, all the photosensitive cells of the at least one plurality of photosensitive cells are scanned in a single movement.

This makes it possible to maximise the measurement accuracy.

Advantageously, the scanning angle of said relative rotation is less than or equal to the angle defined by a first straight line passing on the one hand through the axis of rotation and by a photosensitive cell disposed at a first end of the optical sensor and by a second straight line passing on the one hand through the axis of rotation and through a photosensitive cell arranged at a second end of the optical sensor.

As such the optical center of the optics is always located facing the optical sensor. The optical center does not move over an area that is not covered by the optical sensor.

This makes it possible to not sweep more than the area that includes the photosensitive cells in order to optimise the mechanical motion and as such not expend energy unnecessarily.

Advantageously, said sweep angle is between 1 Δφ and 2 Δφ, advantageously equal to 1 Δφ, where Δφ corresponds to the angle formed by the two optical axes of two adjacent photosensitive cells.

In any case, at least one photosensitive cell is scanned.

In addition, these physical parameters are advantageous in order to approximate a relative rotational movement of the optical center of the optics by a relative translational movement of said optical center at the photosensitive cells.

According to another alternative embodiment and surprisingly, said scanning angle can be between 0.1 Δφ and 2 Δφ. Indeed, it has been observed, surprisingly, that for a scanning angle less than 1 Δφ, this invention can still be implemented and allow for the detection of a contrasted target for example.

Advantageously, said translational movement is carried out in different directions for each one of the optical devices.

This allows for an at least two-dimensional scanning of the contrasted target.

Advantageously, the length of the at least one optical sensor, the length being measured along a direction perpendicular to a line passing through the axis of rotation and through a center of the optical sensor, is between 0.1 mm and 1 m, advantageously between 0.5 mm and 50 cm, and preferably equal to 2.5 mm, and the width of the at least one optical sensor, the width being measured in a direction parallel to a line passing through the axis of rotation and through a center of the optical sensor, is between 0.1 mm and 1 m, advantageously between 0.5 mm and 50 cm, and preferably equal to 2.5 mm.

Advantageously, the length of the photosensitive cells, the length being measured along a direction perpendicular to a line passing through the axis of rotation and through a center of the optical sensor, is between 0.001 mm and 1 m, preferably between 0.01 mm and 10 cm, and preferably equal to 1 cm, and the width of the photosensitive cells, the width being measured in a direction parallel to a line passing through the axis of rotation and through a center of the optical sensor, is between 0.001 mm and 1 m, advantageously between 0.01 mm and 10 cm, and preferably equal to 1 cm.

Advantageously, the photosensitive cells include at least one photodiode, advantageously at least two, and wherein the detection wavelength of the at least one photodiode is between 400 nanometers and 1,000 micrometers, advantageously between 700 nm and 1,000 micrometers, preferably between 700 nm and 1,500 nm.

This makes it possible to work in a restricted spectral range and not to be parasitised by unwanted wavelengths.

Advantageously, the plurality of photosensitive cells includes photosensitive cells configured to detect radiation according to identical wavelengths.

Advantageously, the at least one plurality of photosensitive cells includes photosensitive cells configured to detect radiation according to wavelengths that are different from one another.

This will make it possible to have a versatile detection system for example that allows for working in darkness as well in daylight. Indeed, some photosensitive cells can be configured to detect infrared radiation and others visible radiation.

Advantageously, the actuator is configured to drive in rotation the first support integral with the optics, with the second support being held fixed relative to a frame of the system.

This invention has an application in the field of detection, and more particularly in optical detection for autonomous robotic systems. For example and in a non-limiting way, this invention may relate to an optical detection system of the relative position of a contrasted target with respect to said detection system.

Generically, a contrasted target is a target that has at least one contrast variation (i.e., a luminance difference) between at least two zones of its surface. Commonly, a contrasted target has black areas and white areas.

The development of drones in recent years has not stopped increasing. Now with greater autonomy and GPS location system, drones can be equipped with various instruments in order to perform several tasks. But energy independence is still a problem, limiting the scope of action of the drones. A solution known for a long time by robotics technicians is the use of charging stations of which the position is known to the robot. So robots of the vacuum cleaner type are configured to detect their position relative to their recharging station and assess the energy needed in order to return. Once this energy level is reached, the robot returns to its station to recharge its batteries. In the case of drones, this technology can be applied. However, as drones move outdoors, a charging station by induction has much better resistance to weather conditions: lack of corrosion of electrical contacts, for example. However, induction charging is only effective if the inductive coupling is properly made, requiring great precision in the positioning of the drone in relation to the inductive charging station.

This invention relates to a detection system that is particularly suited to this situation having a hyperacuity enabling the angular locating of a contrasted target. With this location data, the drone can adjust its position relative to the target by the inductive charging station in order to position itself correctly.

According to one embodiment, this invention therefore relates to the realisation of a passive detection system able to locate with great accuracy and nevertheless few photosensitive cells the angular position of a contrasted two-dimensional target. If the distance to the target is known, the detection system makes it possible to know the relative spatial position of the detection system with respect to the target in a horizontal plane. In addition, said detection system also allows for measuring the orientation of the detection system with respect to the target along an axis of rotation perpendicular to the target (yaw axis in the case of the vertical axis). Thus, this system offers, if it is embarked on a drone, all of the measurements required for a fine positioning of said drone in a three-dimensional space with respect to the charging station by induction for drones.

The detection system can supplement a camera (ball camera or on a turret, for example) because, thanks to its ring shape, it can be positioned around an existing camera and therefore does not interfere with the use of the latter for higher-level tasks (observation, inspection, etc.)

FIG. 1a illustrates, according to an embodiment, a drone 1000 moving along a pipeline 3000 in order to perform various tasks such as for example inspecting it using a high-resolution camera. The pipeline has inductive charging stations 2000. The GPS positions of these stations are, for example, known by the drone 1000. Thus the drone 1000 can easily move towards them. However, to effectively recharge and be as fast as possible, the inductive coupling has to be precise.

Figure 1B:
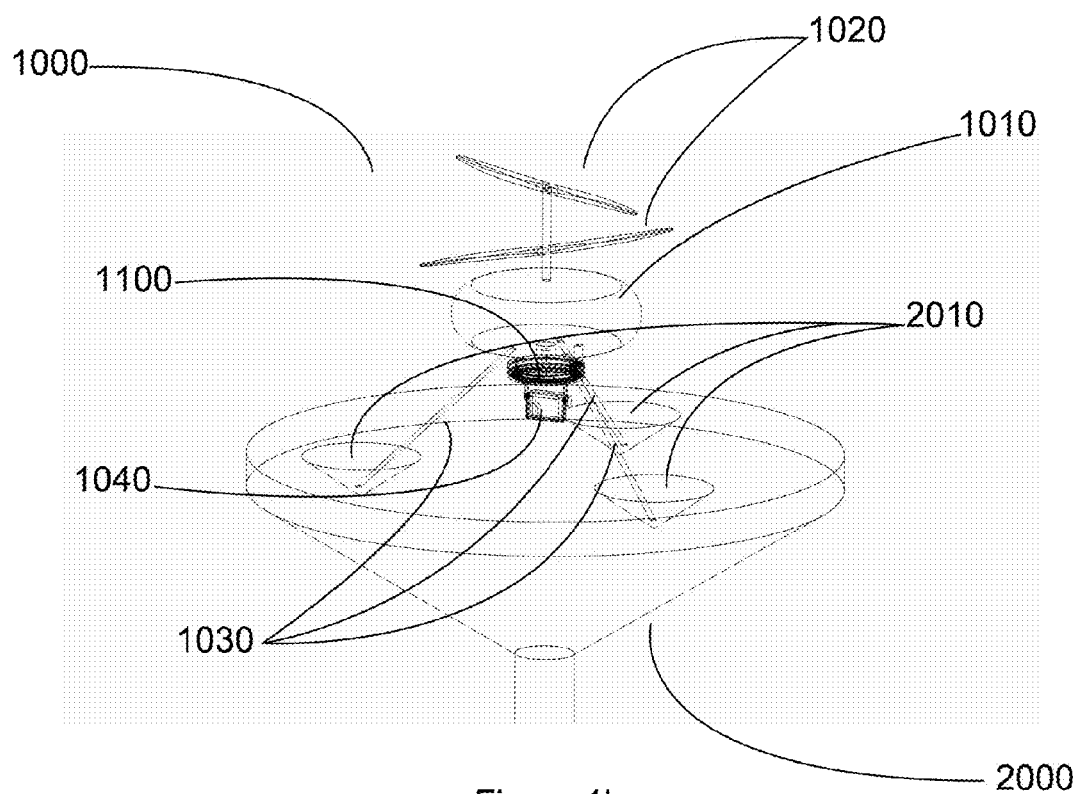
FIG. 1b is a drone on a charging station by induction.

FIG. 1b shows a drone 1000 positioned on an inductive charging station 2000. The drone, according to an embodiment, includes a main body 1010, means of flight and three dimensional movement 1020, holding means 1030 and a high-resolution camera 1040. The holding means 1030 are, for example rods comprising recharging means by induction. These induction charging means are accurately positioned relative to the inductive charging station so that the inductive coupling is maximised, enabling a charge time that is as low as possible for maximum load. To achieve this positioning, the drone 1000 includes a detection system 1100 according to this invention and configured to determine the relative position of the drone 1000 with respect to the inductive charging station 2000 with a hyperacuity.

Indeed, the GPS system allows for a positioning of the drone 1000 in a manner very close to the target, but has a precision of only a few meters. The drone 1000 needs a precision of less than 1 cm, preferably 0.5 cm and preferably equal to 1 mm to position themselves suitably on the inductive charging station in 2000 at the charge points 2010.

Thus, FIG. 1a shows an non-limiting example application of this invention where a drone 1000 provided with the detection system according to this invention can automatically touch down from base 2000 to base 2000 during an inspection phase of pipeline 3000. The bases 2000 here can recharge the batteries of the drone 1000 through induction technology involving fine positioning of the rods 1030 of the landing gear of the drone 1000 with respect to the main charging coils 2010 of the base 2000. FIG. 1b shows an example where the detection system 1100 is mounted on a drone 1000 with counter-rotating coaxial rotors. Another advantage of the detection system 1100 according to this invention is to be mounted around a ball camera 1040 or mounted on a nacelle. The application of this non-limiting example is the positioning of a drone 1000 over its charging base 2000 lined with a contrasted target helping the optical locating of the charging station. The detection system 1100 is configured to measure its angular position with respect to a contrasted target. This invention is configured to determine, as a function of time and at least in two dimensions, the angular position of said detection system 1100 with respect to said contrasted target. The angular position may comprise three angles: $\phi$ for the roll, $\theta$ for the pitch and $\psi$ for yaw.

Figure 2A:
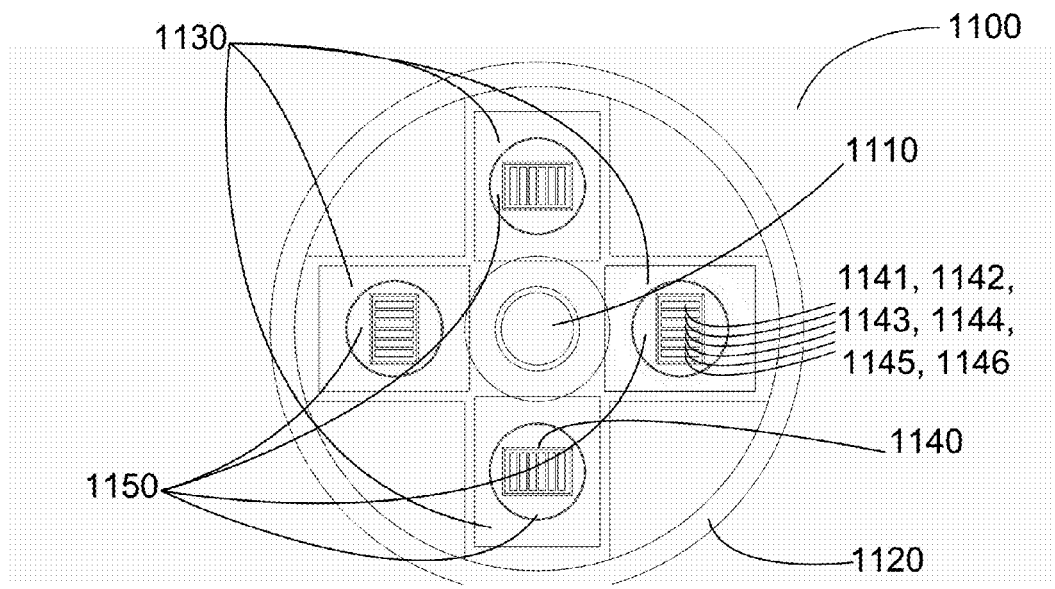
FIGS. 2a and 2b show an optical device, according to an example embodiment of this invention, having 4 eyes arranged crosswise.
Figure 2B:
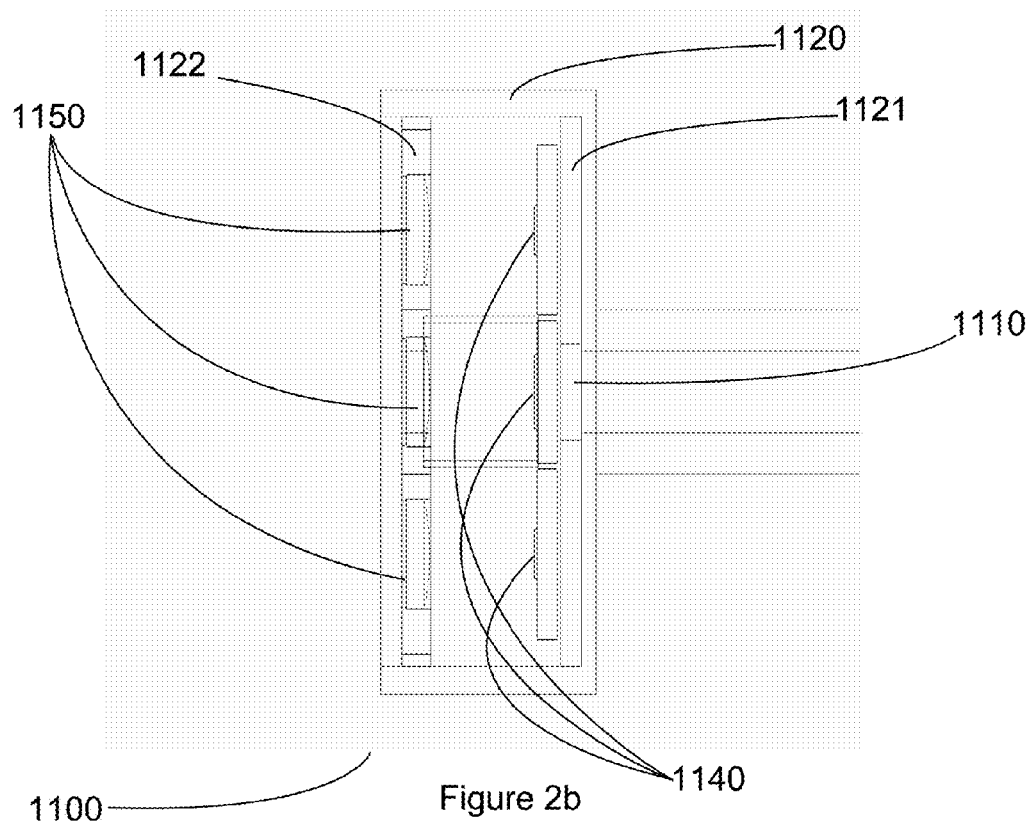

FIGS. 2a and 2b show, according to a first embodiment of this invention, the detection system 1100. This detection system 1100 comprises at least two optical devices, called eyes 1130 in the rest of the description, and preferably four.

Advantageously, these 4 eyes 1130 are arranged in a cross around a central axis 1110 and are supported preferably by a circular support 1120.

According to one embodiment, at least two eyes 1130 are arranged with an angular difference between 0° and 360°, advantageously between 45° and 270° and preferably equal to 90°. The number of eyes 1130 that the detection system 1100 can include is between 1 and 1000, advantageously between 2 and 500 and preferably equal to 4.

In a particularly advantageous manner, each eye 1130 includes at least one optics 1150 and at least one optical sensor 1140.

According to another possible embodiment, the at least one optics 1150 is common to a plurality of optical sensors 1140.

Advantageously, the optical sensor 1140 is positioned on the support 1121 so as to not be in the focal plane of said optics 1150. This particular positioning allows for a first spatial filter by forming a so-called Gaussian blur on the optical sensor 1140. This Gaussian blur corresponds to a substantially Gaussian distribution of the light intensity received by the optical sensor 1140. For example, the optical sensor 1140 is positioned between the optics 1150 and the focal plane of said optics 1150, or when the optical sensor 1140 is positioned beyond the focal plane of said optics 1150.

According to a particularly advantageous embodiment, the optical sensor 1140 includes a plurality of photosensitive cells (1141, 1142, 1143, 1144, 1145, 1146).

The plurality of photosensitive cells (1141, 1142, 1143, 1144, 1145, 1146) is positioned with respect to the optics 1150 so that all light rays transmitted by said at least one optics 1150 are received by said plurality of photosensitive cells (1141, 1142, 1143, 1144, 1145, 1146).

According to a preferred embodiment, each photosensitive cell comprises at least one photodiode, preferably two. These photodiodes are configured to detect a specific range of wavelengths. For example, the photodiode can be configured to only receive light radiation in the range of wavelengths of visible light or only in the range of infrared wavelengths for night applications for example. Thus, preferably, the optical spectrum that can be detected by these or this photodiode is between 400 nanometers and 1,000 micrometers, advantageously between 700 nm and 1000 micrometers, preferably between 700 nm and 1500 nm.

Very advantageously, the photodiodes can be of different types to cover a wide spectral range.

The supports 1121 and 1122 are configured to be able to perform a relative rotation with respect to one another. For example, they are configured so that a bearing allows for this relative rotation.

According to a particularly advantageous embodiment, the support 1122 is configured to be able to be driven in rotation relative to the support 1121.

In another possible embodiment, the support 1121 is configured to be driven in rotation relative to the support 1122.

According to a preferred embodiment the first support 1122 and the second support 1121 are mounted coaxially.

The relative rotation of the support 1122 with respect to the support 1121 is performed about the central axis 1110. This central axis 1110 is parallel to the optical axis of at least one optics 1150. Preferably, this central axis 1110 is not an optical axis of one of the optics 1150. Because the optics 1150 are supported by the support 1122, the relative rotational movement of the support 1122 with respect to the support 1121 comprising the optical sensors 1140 involves a relative rotational movement of the optics 1150 with respect to the optical sensors 1140.

According to a particularly preferred embodiment, the rotational movement of the optics 1150 with respect to the optical sensor 1140 is an oscillating rotational movement so as to generate a periodic scanning of the optical sensors 1140 by the optics 1150. Advantageously, the optical relative rotation of the optics 1150 relative to the optical sensors 1140 is of an amplitude so low with respect to the dimensions of the optical sensors 1140, that this rotation is advantageously similar to a translation.

The equation hereinbelow expresses the relationship that connects the radius R of the optical detection system 1100 between its center and the optical center of the lens 1150 with the arc of the circle d' travelled by the lens 1150 during the scanning of the latter in front of an optical sensor 1140.

$$d' = R\tan\left(\frac{d}{R}\right)$$

With R the radius of the optical detection system between its center and the optical center of the lens 1150, d the distance separating two adjacent photosensitive cells and the arc of circle travelled by the lens 1150 during scanning. We see that if R is very large compared to d and d is small then d' is approximately equal to d.

According to a preferred embodiment, R>>d, advantageously R>10 d, and preferably R>100 d.

Indeed, for example, the angular sector of oscillation of the optical center 1151 of the optics 1150 corresponds to the angular sector formed by the length 1161 of the optical sensor 1140. Thus the arc of circle produced by the optical center 1151 when the oscillating rotation of the support 1122 with respect to the support 1121, is small enough to be comprised by the spatial extent of the optical sensor 1140.

From the point of view of the optical sensor 1140, the optical center carries out a translation, not a rotation. The arc of circle described by the optical center 1151 of the optics 1150 scans the optical sensor 1140.

According to a particular embodiment, the detection system 1100 of this invention is comprised of 4 elementary eyes, themselves comprised of an optics 1150 and an optical sensor 1140 comprising an array of one-dimensional photosensitive cells. The mechanical structure of the detection system 1100 allows the cross structure supporting the 4 optics 1150 to rotate with respect to the electronic card carrying the 4 optical sensors 1140. Thus, if the rotation about the central axis 1110 is of small amplitude (of about a few degrees) and periodic, while the four optics 1150 are simultaneously translated with respect to each fixed photodiode, then creating a periodic one-dimensional optical scan of the optical axes of each one of the 4 eyes 1130. Completely reversibly, the assembly shown in FIGS. 2a and 2b also allow for a translation of the photosensitive cells behind each fixed optics 1150.

Figure 3A:
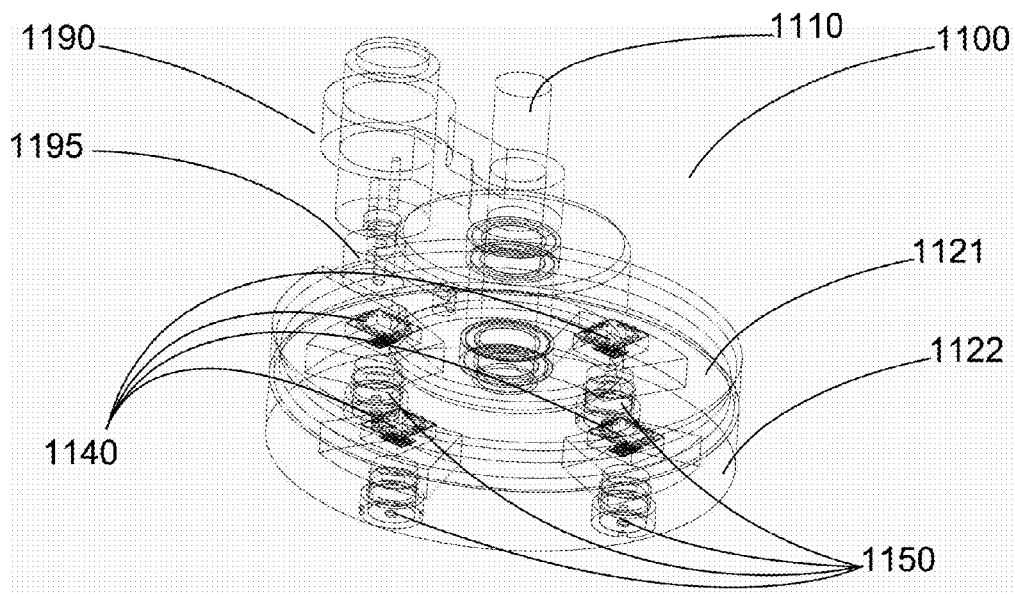
FIGS. 3a and 3b show an optical device, according to an embodiment of this invention, having 4 eyes arranged in a cross and an unique actuator.
Figure 3B:
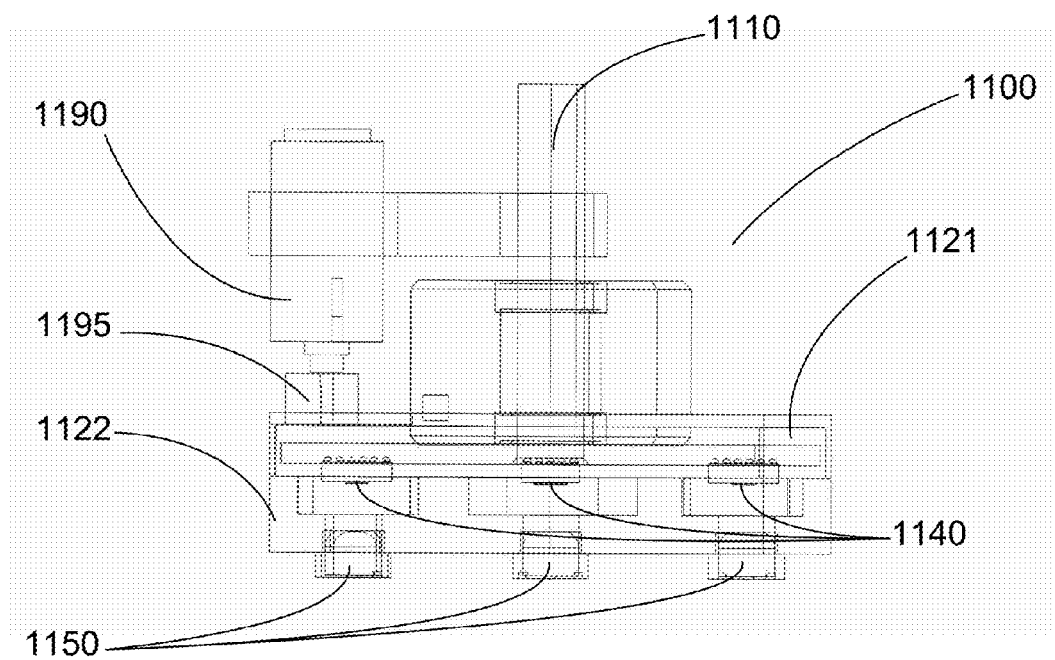

According to an embodiment, one of the advantages of the configuration proposed in FIG. 2a is to be able to implement two different directions (here orthogonal) of optical scanning with an unique actuator 1190. FIGS. 3a and 3b show an example for mounting a motor 1190 used to generate the periodic oscillating rotational motion of small amplitude (vibration, otherwise called oscillation). The principle here is based on the implementation of an eccentric 1190 offering the following advantages:

Simplicity and mechanical strength;

The motor 1190 rotates in one direction: avoiding round-trip movements responsible for premature wear;

Change of frequency optical scanning is very simple by just changing the rotation speed of the motor 1190.

FIGS. 3a and 3b show, according to an embodiment, the detection system 1100 and its mechanical system periodically oscillating rotation around the axis of rotation 1110 including an actuator 1190 and a coupling element 1195 with the support 1122 so as to allow the optics 1150 to oscillate in front of the optical sensors 1140. This actuator 1190 can be an electric motor for example.

Preferably, the actuator 1190 is an eccentric motor for a periodic oscillating movement about the axis of rotation 1110 of any mechanical moving part through the intermediary of the coupling element 1195.

As such, this invention uses an unique actuator 1190 in order to achieve periodic oscillating rotation of a plurality of optics 1150. This then allows for high synchronicity of the optical scans but also a reduction in the weight and volume of the detection system 1100 in comparison with prior art which requires one actuator per eye. Here, an unique actuator 1190 is configured to cooperate with a plurality of eyes 1130. The oscillation frequency can be changed easily by changing the speed of rotation of the actuator 1190.

According to an embodiment, the mechanical coupling 1195 is provided between the actuator 1190 and the support 1121 so as to allow the optical sensors 1140 to oscillate relative to the optics 1150 which remain fixed in according to this embodiment.

According to another embodiment, the actuator 1190 provides continuous rotation of the support 1122 or of the support 1121. As such, according to this embodiment, a continuous rotation of at least one support relative to the other allows for a periodic scanning of the optical sensors 1140 through the optical center 1151 of the optics 1150. According to this embodiment at least one optics 1150 is required.

FIGS. 3a and 3b show a non-limiting example of implementation of the eccentric motor 1190 used to generate the periodic movement of optical scanning of low amplitude. The motor 1190 rotates a cylinder 1195, of which the axis of rotation does not pass through its center. This cylinder 1195 is positioned in an oblong hole made in the part 1122 that supports the 4 optics 1150. Thus upon rotation of the eccentric, the part 1122 supporting the 4 optics 1150, mounted on a bearing, then undergoes a periodic rotation motion of small amplitude (a few degrees) around the axis 1110. Here it is the optics 1150 which, locally undergo periodic micro-translation while the 4 optical sensors 1140 (retinas) are fixed.

With the sweeping movement in two orthogonal directions, it is possible to locate a two-dimensional contrasted target 1112 of the cross type for example, ellipse or even a marker of the 4 quadrant type similar to those used in crash tests for example. This type of marker has the advantage of being invariant regardless of the distance that separates the detection system 1100, contrary to a cross of which the subtended angle of each bar varies with the distance.

As clearly shown in the figures and as is apparent from the description, the optical devices 1130 are distributed around a circle or a ring centerd on the axis of rotation 1110.

FIGS. 4a to 4d show several examples of two-dimensional contrasted targets 1112. These targets 1112 have at least a central symmetry in their configuration. They advantageously include a strong optical contrast in their configuration. Advantageously these targets 1112 are composed of black elements on a white background.

A branch is one of the concurrent lines forming a target 1112. It is assumed that a target 1112 has b straight lines which are all concurrent at the same point. As such, a cross has two branches, a pattern also four quadrants. According to an embodiment, the target study is restricted wherein the number of branches b is a multiple of 2 (b=2k, where k∈ℕ) in order to ensure that the angle that separates the branches is a divisor of $$\frac{\pi}{2}$$

i.e. there is an eye 1130 with angles 0, $$\frac{\pi}{2}, \pi, \text{et } \frac{3\pi}{2},$$

in order to have a direct measurement of the angles Φ and θ). According to one embodiment, the number of branches b can be of any number.

FIGS. 4e to 4i illustrate examples of two-dimensional scans of two-dimensional contrasted targets 1112. Each scan A, B, C and D is one-dimensional. The combination of at least two one-dimensional scans A, B, C and D corresponds to a two-dimensional scanning. Indeed, the angular spacing of scans between the pairs (A, C) and (B, D) allows for two-dimensional scanning of the target 1112 simply by performing two one-dimensional scans having a non-zero angular difference.

Figure 4I:
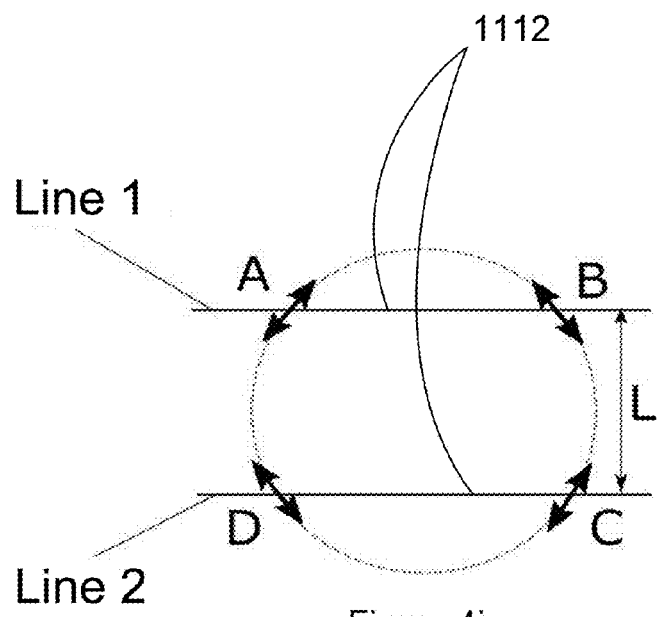

According to an embodiment, shown in FIG. 4i, this invention makes it possible to determine the position of the detection system 1100 relatively to two lines 1112 of which the distance L separating them is previously known by the detection system 1100. Indeed, if the distance L is known then it is possible, for example by triangulation, to go back to a distance information between the detection system 1100 and the 2 lines 1112. According to one non-limiting example, these two lines can be two cables, two rails or two lines on a wall or two posts.

According to one embodiment wherein the device 1100 includes 4 eyes 1130, each eye 1130 corresponds to a one-dimensional scanning A, B, C and D. In this configuration, the 4 eyes 1130 are arranged according to FIG. 2a, i.e. in a cross.

According to FIG. 4e, the scans A and C do not allow for the detection of contrasted target 1112 which includes only one black line on a white background.

Indeed, only scans B and D enable the detection of a change in contrast.

According to FIG. 4f, the scans B and C are the only ones allowing the detection of the contrasted 1112.

According to FIG. 4g, all of the eyes of the device 1100 detect the change in contrast when scans A, B, C and D allow for detecting the contrasted target 1112.

According to FIG. 4h, the scans B and C allow for the detection of the contrasted target 1112.

According to FIG. 4i, scans A and B make it possible to locate a first line 1112, while the C and D scans allow the locating of a second line 1112.

It appears that two eyes 1130 that have a non-zero angular deviation are required for the optical determination of a two-dimensional contrasted target 1112. However, it also appears that as the number of eyes 1130 increases, the better the optical determination of the two-dimensional contrasted target 1112 is.

In the case of a cross, an adequate melting of the signals of each eye 1130 makes it possible to locate the object in a plane but also to know the relative orientation (case shown in FIG. 4h) with respect to the detection system 1100.

Figures 4J, 4K:
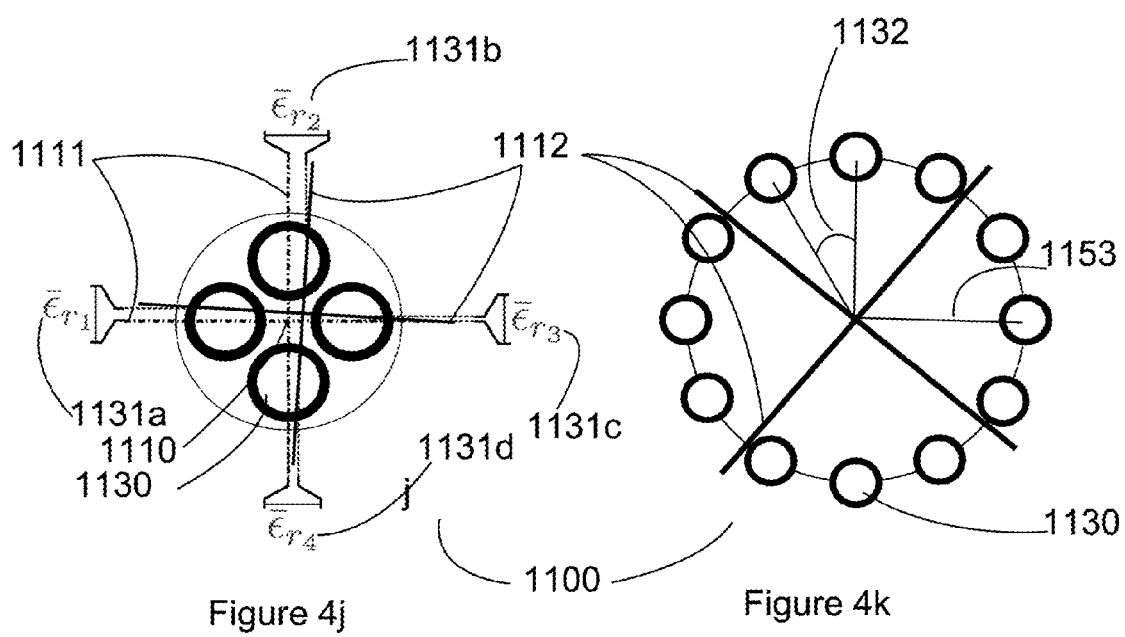

FIGS. 4j and 4k show, according to two different embodiments of this invention, the scanning principle by the detection system 1100 of a contrasted target 1112. The scanning of the target 1112 by each one of eyes 1130 of the device 1100 leads to a local measurement 1131a, 1131b, 1131c, 1131d for each eye. These local measurements of light intensity make it possible to detect the contrasted target 1112. Indeed, the eyes 1130 measure the light intensity and when the spatial scanning passes through a change in contrast, the light intensity is then modified, and the eye 1130 detects this change in contrast.

It seems obvious in light of FIG. 4k that the higher the number of eyes 1130 is, the more accurate the detection of the two-dimensional contrasted target 1112 will be.

Indeed, according to the orientation of the two-dimensional contrasted target 1112 compared to the eye 1130, in the case where there are only 4 eyes 1130, the target 1112 cannot be seen as there is a branch every 90° and the visual field of an eye 1130 is between 0° and 360°, advantageously between 45° and 315°, and preferably equal to 90°. The use of additional eyes 1130 overcomes this problem.

The additional eyes 1130 provide more redundancy and thus a fusion of better quality, less sensitive to measurement noise, in the signal processing chain that shall be described later in the description. In addition, a greater number of eyes 1130 implies a larger diameter of the detection system 1100 and hence better accuracy of the measurement of the drone's yaw angle.

FIG. 4k shows a top view of the detection system 1100: The angle β 1132 corresponds to the angle separating two eyes 1130, all arranged uniformly on a circle with radius $r_c$ 1153.

According to one embodiment, FIG. 4j shows the measurement 1131a, 1131b, 1131c, 1131d taken by each one of the eyes 1130 if a cross 1112 is placed oriented arbitrarily below the detection system 1100. An orthonormal coordinate system (O, x, y, z) can be defined such that O is the center of the circle on which are arranged the eyes 1130, the x and y vectors both point to two different eyes 1130 positioned at 90° to one another. In this example, the target 1112 is a distance D on the −z axis (i.e. below the eye 1130) perpendicular to the x axis and to the y-axis. It is assumed that this cross is oriented by an angle Φ according to the roll, θ according to the pitch and by an angle ψ in yaw with respect to the detection system 1100.

Note $\varepsilon_{r_i}$ the angular position of the contrast in the field of vision of the eye i, the three orientations of the target can be deduced from it. The first two orientations are trivial:

$$\overline{\Phi} = \tfrac{1}{2}(\overline{\varepsilon}_{r_2} + \overline{\varepsilon}_{r_4})$$

$$\overline{\theta} = \tfrac{1}{2}(\overline{\varepsilon}_{r_1} + \overline{\varepsilon}_{r_3})$$

Where the notation $\overline{X}$ is the measure of the magnitude X.

The orientation according to the yaw in turn depends on the geometry of the detection system 1100, especially the distance $r_c$ between the optical center 1151 of the optics 1150 and the center of the axis of rotation 1110 of the system of detection 1100, as well as the distance D that separates the center of the detection system 1100 from the target 1112. The orientation according to the yaw is obtained by averaging the measurement of the orientation taken by the pair of eyes opposite to each other.

$$\overline{\psi} = \frac{1}{2}\left[\tan^{-1}\left(\frac{D\cdot\tan\left(\frac{\overline{\varepsilon}_{r_1} - \overline{\varepsilon}_{r_3}}{2}\right)}{r_c}\right) + \tan^{-1}\left(\frac{D\cdot\tan\left(\frac{\overline{\varepsilon}_{r_2} - \overline{\varepsilon}_{r_4}}{2}\right)}{r_c}\right)\right]$$

Where $r_c$ is the radius of circle 1153 on which are arranged the eyes and D is the distance between the detection system 1100 and the target 1112 (projected on axis Oz).

In the case of small angles ψ<20°), where it can be considered that tan X=X, the calculation is simplified as follows:

$$\bar{\psi} = \tan^{-1}\left(\frac{D \cdot \tan(\bar{\alpha})}{r_c}\right)$$

$$\text{avec } \bar{\alpha} := \frac{1}{4}((\bar{\epsilon}_{r_1} - \bar{\epsilon}_{r_3}) - (\bar{\epsilon}_{r_2} - \bar{\epsilon}_{r_4}))$$

Figure 5A:
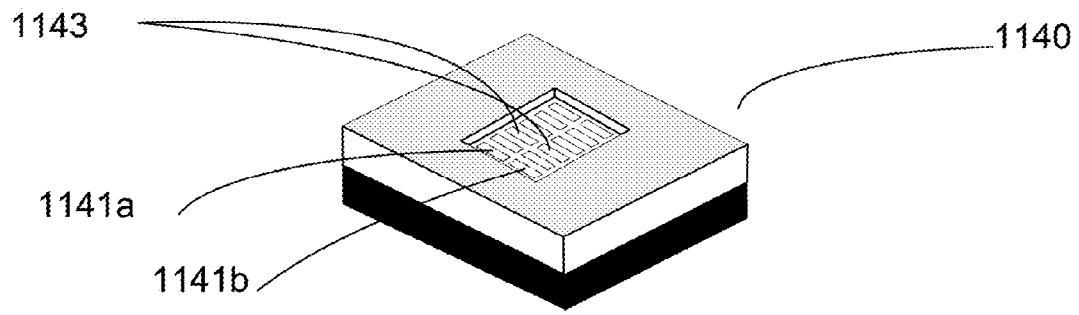
FIGS. 5a and 5b show, according to an embodiment of this invention, an example sensor according to the invention comprising the plurality of photosensitive cells included in one eye.
Figure 5B:
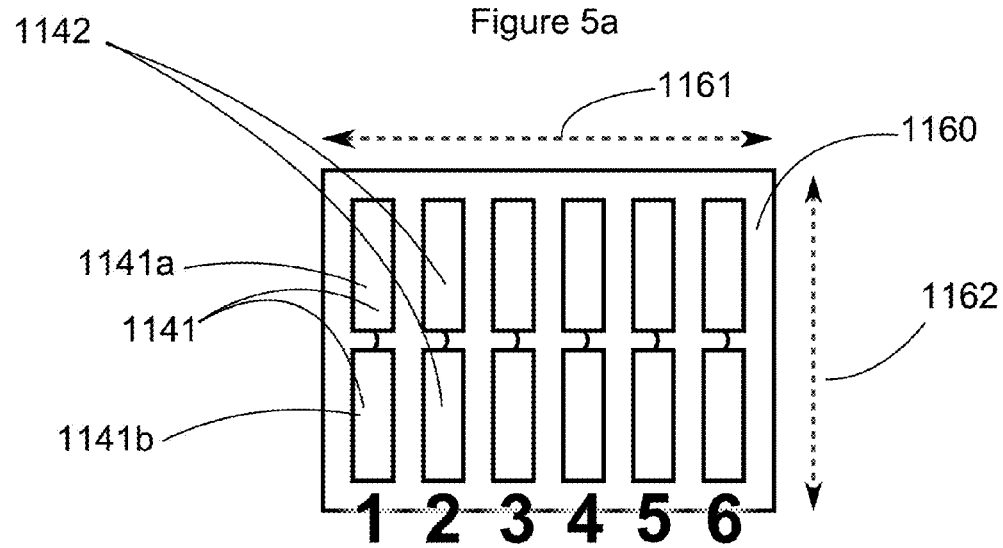

FIGS. 5a and 5b show, in an embodiment, an optical sensor 1140 comprising an eye 1130 of the detection system 1100 according to this invention.

The optical sensor 1140 includes at least two photosensitive cells 1141 and 1142, advantageously comprising 6 photosensitive cells 1141, 1142, 1143, 1144, 1145, 1146.

The invention applies to optical sensors having highly varied dimensions. Indeed it will be advantageous for both small sensors and for large-size sensors.

According to an embodiment, the number of photosensitive cells comprised by the optical sensor 1140 is between 1 and 1000, advantageously between 2 and 500, and preferably equal to 5.

Advantageously and in a non-limiting manner, the number of photosensitive cells comprised by the optical sensor 1140 is according to the application fields of this invention.

Advantageously, a photosensitive cell 1141 comprises at least two photosensitive cells 1141a and 1141b, supported by a support 1160.

Advantageously and in a non-limiting manner, the support 1160 has a length that depends on the number of photosensitive cells and therefore on the application fields of this invention.

Advantageously and in a non-limiting manner, the support 1160 has a width 1162 that is a function of the number of photosensitive cells and therefore of the application fields of this invention.

These dimensions, made in comparison with the arc of circle described by the optical center 1151 of the optics 1150, will allow an approximation of the relative rotational movement of the optics 1150 relative to the optical sensor 1140 as a translational movement.

FIGS. 5a and 5b diagrammatically show an optical sensor 1140 with 6 photosensitive cells, each one consisting of two photosensitive cells in a non-limiting way, of an eye 1130 of the detection system 1100 according to this invention. The optical sensor 1140 is advantageously constituted of a matrix of photosensitive cells 1141a, 1141b, 1142a, 1142b, 1143a, 1143b, 1144a, 1144b, 1145a, 1145b, 1146a, 1146b. Advantageously, the photosensitive cells can be connected vertically in such a way as to improve the sensitivity of the optical sensor 1140.

FIGS. 6a to 6d show the optical parameters of an eye 1130 according to an embodiment of this invention, and more particularly the optical paths of light rays 1165 passing through the optical center 1151 of the optics 1150, received by the photosensitive cells, such as for example by the photosensitive cell 1141.

According to an embodiment, FIGS. 6a to 6d show the optical configuration parameters characteristic of an eye 1130. The distance 1152 $L_f$ is the distance between the photosensitive cells and the optics 1150, and $\delta_{PhD}$ is the distance 1163 between two adjacent photosensitive cells, otherwise known as pitch distance. The adjustment of the length 1152 $L_f$ makes it possible to change the angle between two adjacent optical axes 1164 Δφ).

Figure 6A:
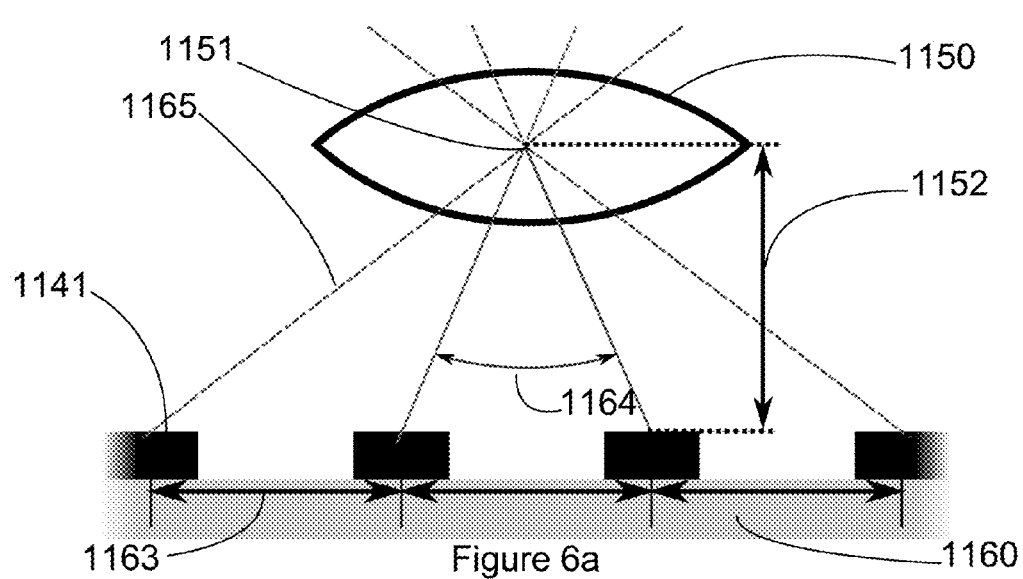
FIGS. 6a to 6d show the optical geometry of an example eye of this invention, according to an embodiment, in static mode and in a situation of a movement of the optics with respect to the optical sensor.
Figure 6B:
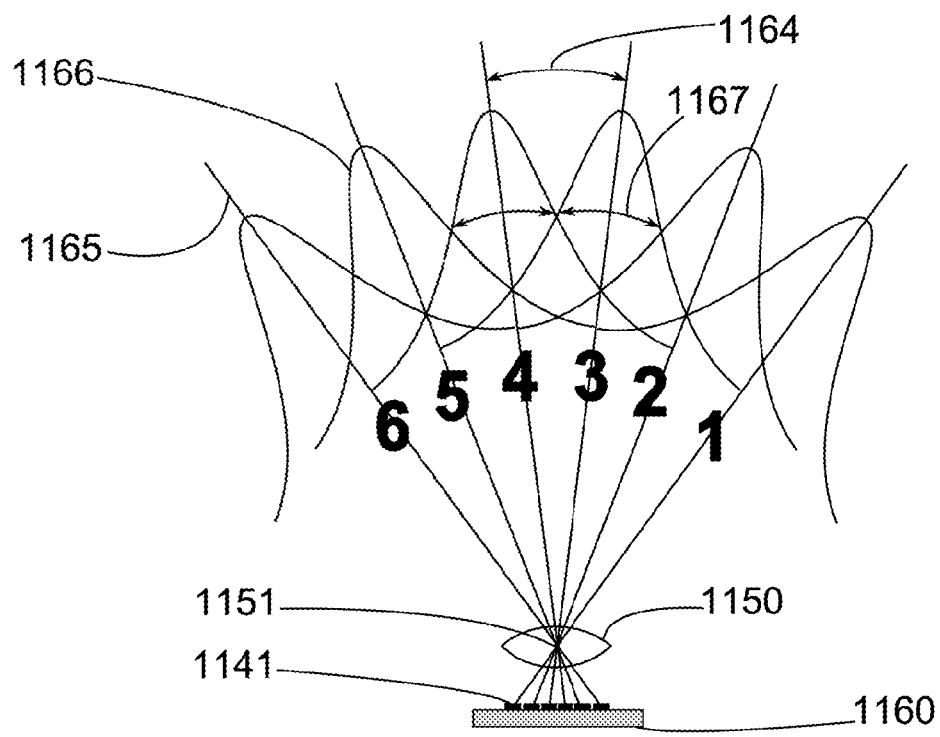

FIG. 6b diagrammatically shows the optical parameters of an eye 1130 comprising 6 photosensitive cells highlighting the acceptance angle 1167 Δρ, and the angle 1164 Δφ.

Figure 6C:
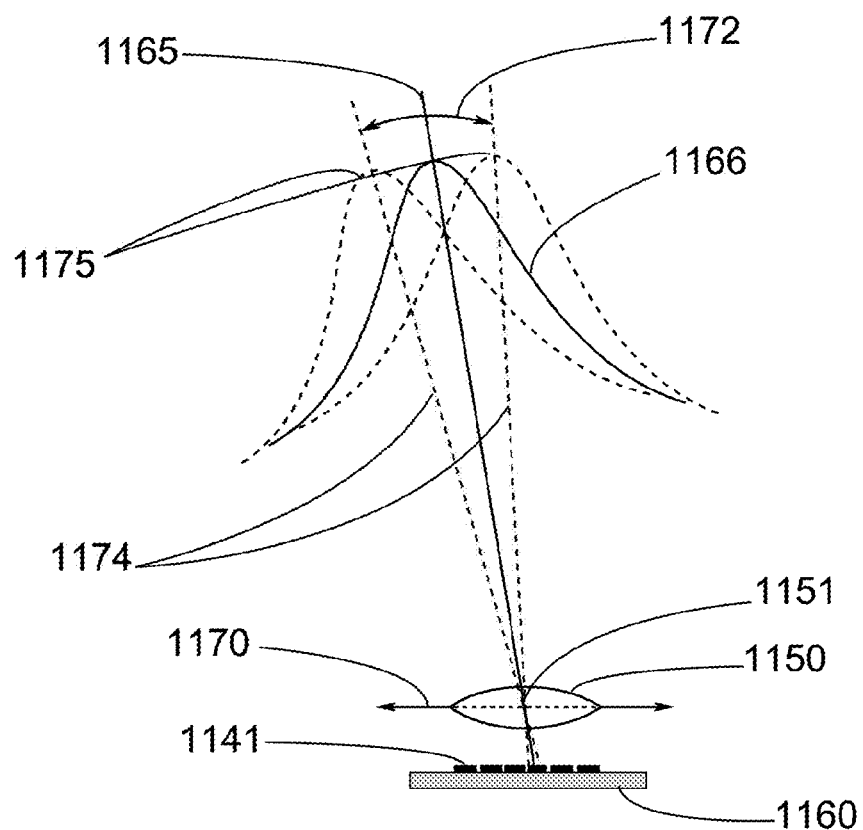
Figure 6D:
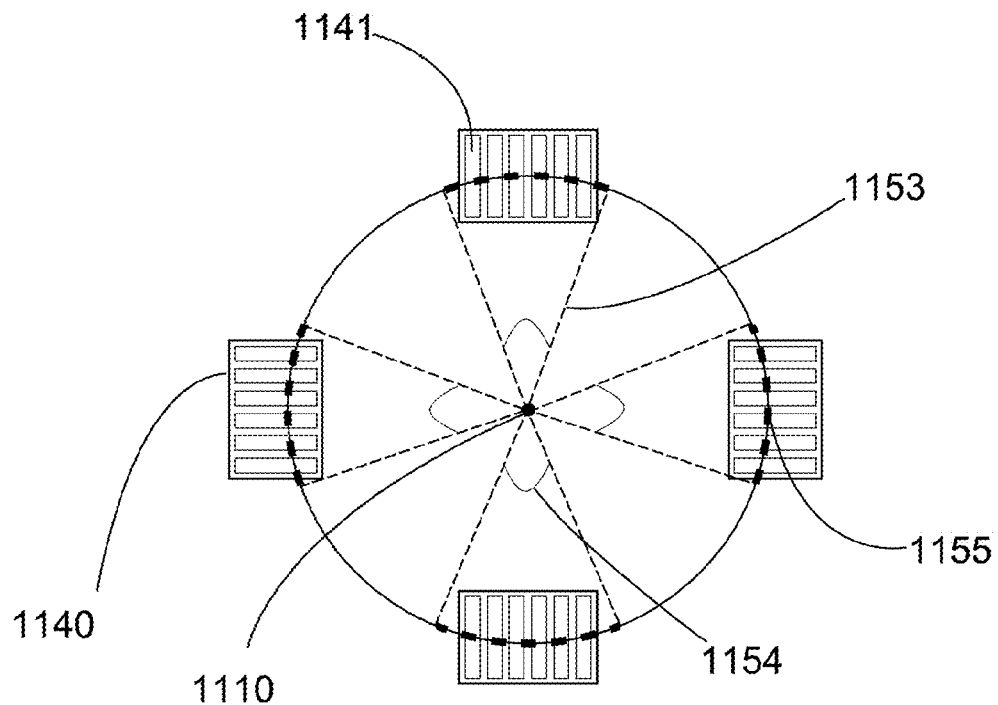

FIG. 6c diagrammatically shows the amplitude of vibration 1172 $\Delta\psi_{mod}$ obtained by a translation of the optics 1150, as such creating a synchronous amplitude modulation 1172 $\Delta\psi_{mod}$ for each photosensitive cell. The same modulation can be obtained by moving the optical sensor 1140 placed behind a fixed optics 1150.

Advantageously and in a non-limiting manner, the detector/detector distance 1163 separating two adjacent photosensitive cells is according to the application fields of this invention.

According to an embodiment, the optics/sensor distance 1152, separating a plane passing through the optical center 1151 of optics 1150 and parallel to the support 1160, and a plane passing at the level of the photosensitive cells 1141, 1142, 1143, 1145, 1146 and parallel to the support 1160, is between 0.001 mm and 1 m, advantageously between 0.1 mm and 0.5 m and preferably equal to 1 mm. According to the applications considered the distance can go beyond these intervals.

Advantageously and in a non-limiting way, the angle 1164 formed by the optical paths 1165 proper to two adjacent photosensitive cells is according to application fields of this invention.

According to an embodiment, the angle 1164 formed by the optical paths 1165 proper to two adjacent photosensitive cells is between 0.1° and 10°, advantageously between 1° and 5° and preferably equal to 4°.

According to an embodiment, the angle 1167, called acceptance angle, which reflects the angular sensitivity of each photosensitive cell, is between 0.1° and 10°, advantageously between 1° and 5° and preferably equal to 4°.

Advantageously, the detector/detector distance 1163 is fixed by the design of the optical sensor 1140, only the optical/sensor distance 1152 may serve as an adjustment parameter of the angle 1164 and of the acceptance angle 1167.

According to a preferred embodiment, the plane containing the optical sensor 1140 is not contained in the focal plane of the optics 1150 so that the optics 1150 is called defocused with respect to the optical sensor 1140. This defocus results in a Gaussian distribution 1166 of the light intensity received by the photosensitive cells 1140. This Gaussian blur is then used as a spatial low-pass filter. Likewise the vibrations transmitted to the device when the latter is mounted on a flying vehicle can improve the sensitivity of this detection system 1100.

When the actuator 1190 engages the support 1122, the optics 1150 then performs a relative rotational movement with respect to the optical sensor 1140. This relative rotational movement corresponds to an oscillation. This oscillation of the optics 1150 corresponds to an oscillation of its optical center 1151. This oscillation involves a scanning of the optical sensor 1140 by the optical center 1151. Thus the Gaussian distribution of the light intensity received 1166 by each photosensitive cell undergoes an oscillation 1172 thereby forming a plurality 1175 of Gaussian distribution of the light intensity 1166 received by each photosensitive cell. The plurality 1175 of Gaussian distributions of the light intensity 1166 received by each photosensitive cell corresponds to one-dimensional angular optical scanning.

Figure 7A:
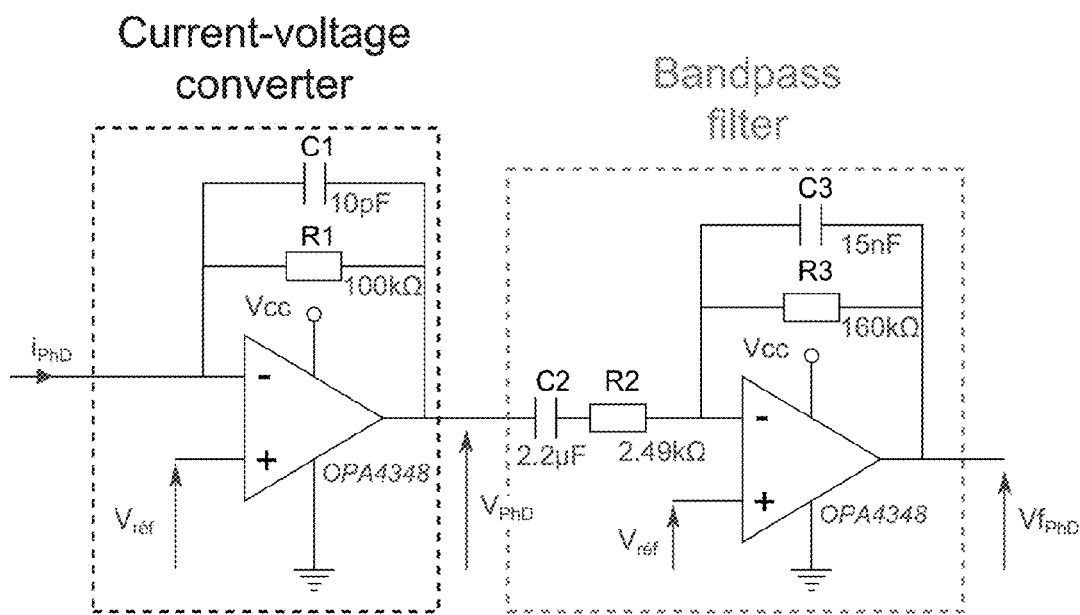
FIGS. 7a and 7j show, according to an embodiment of this invention, the processing of the optical signals measured by an eye according to this invention.
Figure 7B:
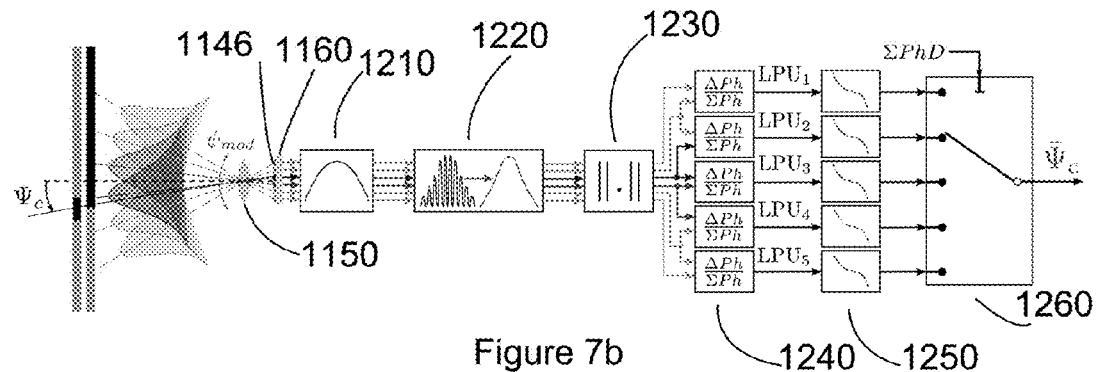
Figure 7C:
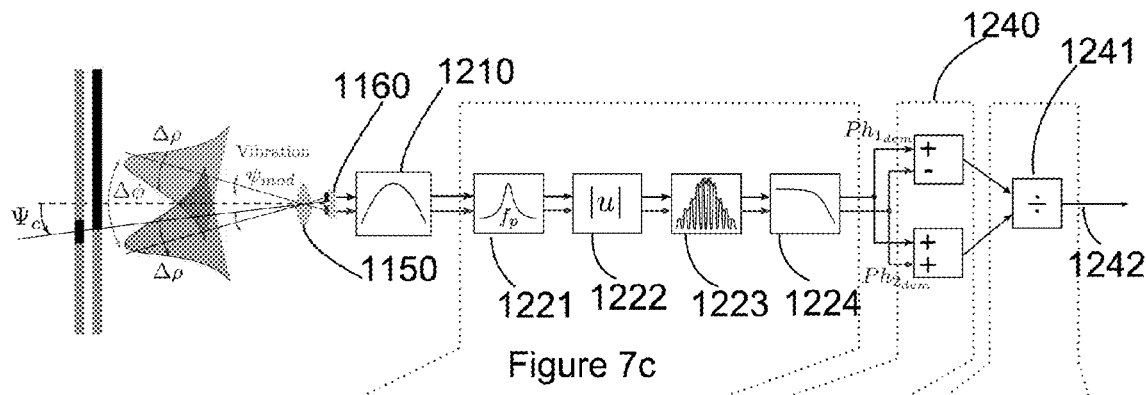
Figure 7D:
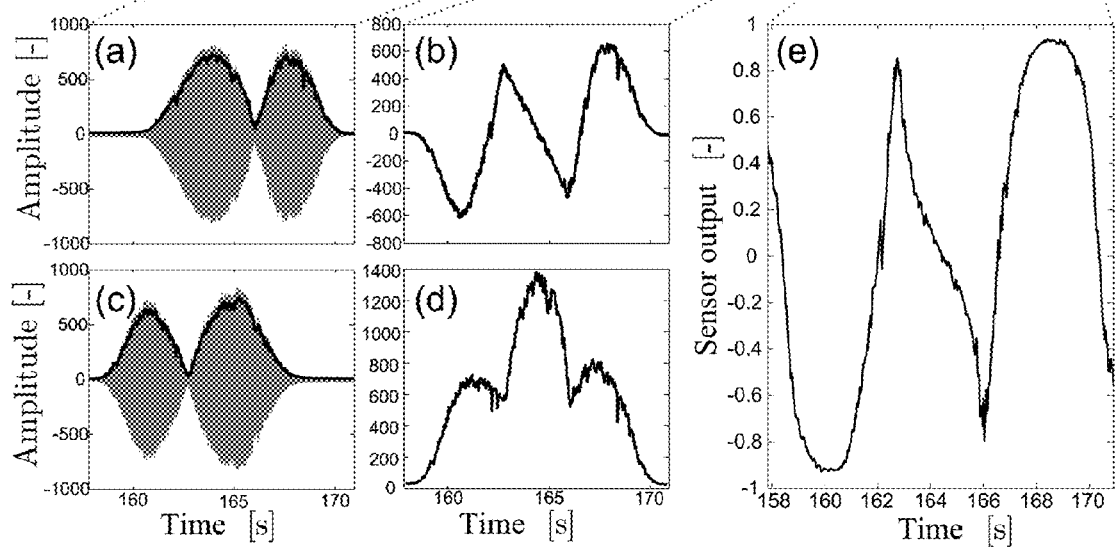
Figure 7I:
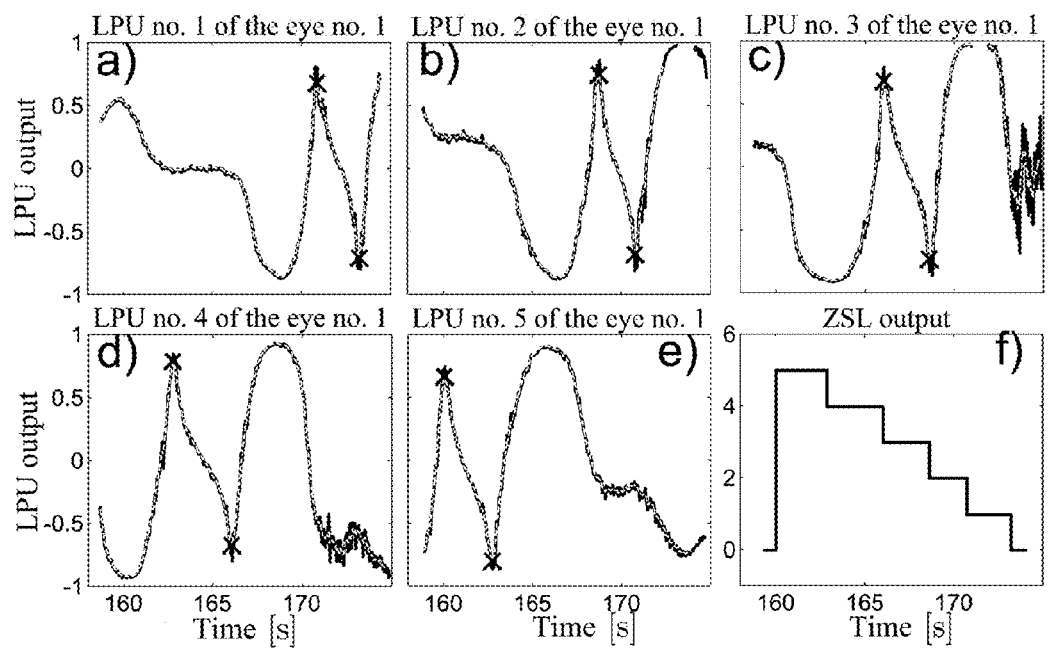
Figure 7J:
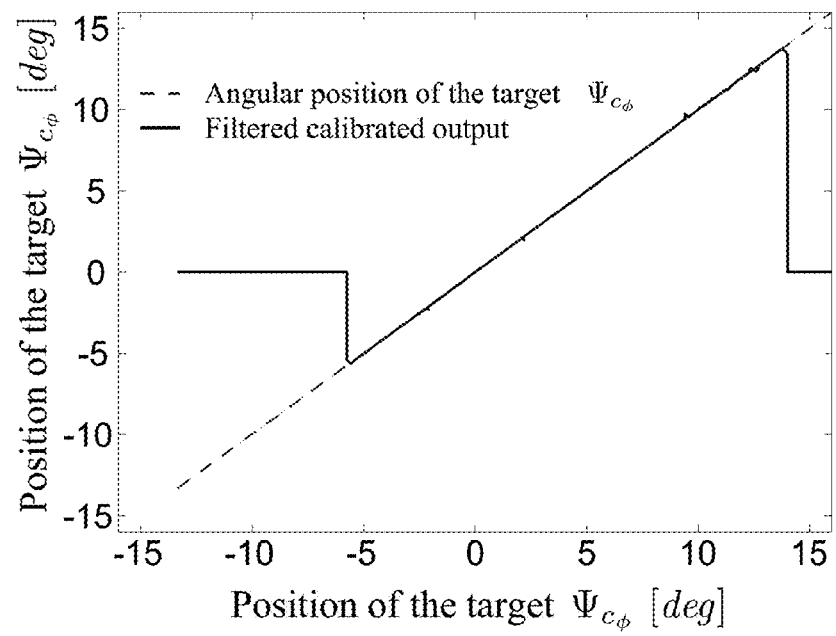

FIGS. 7a and 7i illustrate different steps of optical measurements and signal processing obtained from this invention.

According to an embodiment shown by FIG. 7a shows a portion of the electronic processing performed in parallel for each photosensitive cell. The current of the photosensitive cells $i_{Ph}$ is amplified, low pass filtered and converted into voltage ($V_{Ph}$) by the first stage corresponding to the current-voltage converter. The second stage, the bandpass filter performs band-pass filter function, thanks to a high-pass filter followed by a low-pass filter. The voltage $Vf_{Ph}$ is then the filtered image of the light intensity received by the photosensitive cell and is then digitised by an analogue-digital converter.

FIG. 7b corresponds to an overall diagram of the measuring chain of the light rays emitted by a contrasted target 1112 and received by an eye 1130 according to this invention comprising at least one optics 1150, an optical sensor 1140 and a processing chain (1210, 1220, 1230, 1240, 1250, 1260) of the optical signals measured by the eye 1130.

As such, FIG. 7a shows a complete block diagram for switching signals of the 6 photosensitive cells to the measurement of the angular position of the eye 1130 with respect to the contrasted target 1112. The signal of each photosensitive cell is demodulated then standardised. Then the difference in the sum of the demodulated signals is carried out, forming as such 5 Local Processing Units (LPUs). A table of correspondence is then applied so as to convert the output of the eye 1130 into a measurement of angular position. Finally, a ZSL detector (Zero-Setting-Limit) selects the pair that best sees the contrast in order to redirect its measurement to the output of the eye.

In the case of a detection system 1100 such as shown in FIG. 2a, there are 4 eyes 1130 each comprising 5 LPUs.

As it is, each of the 4 eyes 1130 provides a measurement of the angular position of a contrast with a precision of about 0.1° over a full field of view of about 20° for example.

Advantageously and in a non-limiting manner, the field of vision of an eye is according to the application fields of this invention.

According to an embodiment, the field of vision of an eye is between 1° and 60°, advantageously between 1° and 30° and preferably equal to 20°.

Each one of the eyes 1130 can locate a contrast of the edge, or bar, type, and the eyes 1130 are advantageously arranged on a circle and spaced from each other by an angle of between 0° and 360°, advantageously between 45° and 270°, and preferably equal to 90°.

According to this configuration, it is possible to precisely locate cross-type targets or four-quadrant target if each eye 1130 locates one of the 4 bars of the cross or of 4 edges of the target.

FIG. 7c shows the same measurement chain in the case where the optical sensor 1140 includes only two photosensitive cells.

In FIGS. 7b and 7c, optics 1150 describe a comparable movement similar to a translation with respect to the optical sensor 140.

According to an embodiment, each optics 1150 is positioned above an optical sensor 1140, the latter is not in the focal plane of said optics 1150 so as to generate a Gaussian blur which makes it possible to achieve a spatial filtering of the contrasts and thus eliminate the finest details.

For each eye 1130 an inter-receiver angle 1164 and an acceptance angle 1167 are defined, both being a function of the distance separating the optical sensor 1140 and optics 1150.

Each eye 1130 is driven by a relative rotational movement of the optics 1150 relative to the optical sensor 1140 so as to modulate the signal of each photosensitive cell.

Each eye 1130 is composed of a number N of photosensitive cells making it possible to create N−1 pairs of photoreceptors. Each pair makes it possible, thanks to a processing performed by an LPU, to locate in its visual field contrast of the bar or edge type. The output signal of each photosensitive cell is first filtered analogically by a bandpass filter 1210, making it possible to preselect of the carrier frequency (the frequency of oscillation of the optics 1150), perform a pseudo-derivative and thus center the signals at the input of the analogue-digital converters.

After being digitised, each signal is again filtered using a 1221 selective filter centerd on the carrier (thereby nullifying the effect of other flickering that can be present such as flickering neon lights at the frequency of 100 Hz). Then an absolute value 1222 is applied to the signal before demodulation. The demodulation is carried out by envelope detection of 1223, then the envelope is cleared of residual carrier components thanks to a low pass filter 1224.

All of these steps then allow for the demodulating of the signals measured by the photosensitive cells. Then the ratio of the difference of the demodulated signals of a pair on the sum of the latter is used to calculate an output signal $Si_{LPU}$.

The final output $Si_{LPU}$ of each LPU is given by the ratio of the difference demodulated signals of a pair over the sum of the latter:

$$S_{i_{LPU}} = \frac{|\dot{P}h_{1_{dem}}| - |\dot{P}h_{2_{dem}}|}{|\dot{P}h_{1_{dem}}| + |\dot{P}h_{2_{dem}}|}$$

The outputs of the LPU have a characteristic which depends on the angular position of the contrasted object, the subtended angle of the object and the optical parameters of the eye. However, the value of output S is independent of the value of the contrast.

Thus, each LPU generates an output signal $Si_{LPU}$ that is proportional to the angular position of the contrasting object placed in its local visual field. The characteristic of the output signal of the position depends on both the intrinsic parameters of the eye 1130 and the nature of the contrasted target 1112. A calibration table can be obtained during a calibration phase in order to build the correspondence between the raw output of each LPU and the actual position of the contrasted target 1112.

As an eye 1130 is composed of several photosensitive cells, a criterion, for moving from one LPU to another and for detecting if a contrast is present or not in the visual field of the eye 1130, is set up. This function is performed by a ZSL detector. This ZSL detector makes it possible to select the LPU that has in its visual field the highest contrast and to detect when no contrast is seen and as such force the output $Si_{LPU}$ to be equal to 0.

According to an embodiment, it is considered that the LPU sees a contrast if the sum of the demodulated signals is above a certain threshold and if an adjacent LPU also sees a contrast. A second criterion described hereinafter is also set up in order to choose the best LPU.

According to an embodiment, FIG. 7c shows the processing chain of an LPU. A vibration and/or oscillation of the optics 1150 makes it possible to modulate the position of the contrast, and a first analogue filter performs a pseudo-derivative and also acts as an anti-aliasing filter. The carrier is then extracted using a bandpass filter, an absolute value combined with an envelope detector allows after a low pass filtering to extract the envelope from each photosensitive cell ($Phi_{dem}$).

According to an embodiment and a non-limiting application example, FIG. 7d (a) and (c) show the step of demodulating with an example of a signal thus obtained. The curve with the highest contrast is the final envelope of the signal after applying the low pass filter. FIG. 7d (b) shows the difference demodulated signals ($Ph1_{dem}$-$Ph2_{dem}$) and FIG. 7d (d) shows the sum of signals ($Ph1_{dem}$+$Ph2_{dem}$). FIG. 7d (e) shows the signal output of the optical sensor obtained for a 2 cm width bar located 1.32 m (i.e. at a subtended angle equal to 0.87°) resulting from the difference in the sum of the demodulated signals. Finally, FIG. 7e shows the simulated characteristic response of an eye comprising two photosensitive cells L (here $\Delta\rho$=Delta$\phi$=3.8°).

The output signal varies with the subtended angle ($\alpha$) with respect to the contrasted target 1112 which here is a simple bar. It is noted that for subtended angles that are too low the characteristic of the eye 1130 becomes non-monotonous, making it impossible to derive a measurement of the position of the bar from the output of the eye 1130. FIG. 7f shows the simulated response characteristic of an eye 1130 with two photosensitive cells to a target with a contrast edge.

In FIGS. 7e and 7f, the dotted lines represent the interval $$\left[-\frac{\Delta\phi}{2}; +\frac{\Delta\phi}{2}\right]$$

corresponding to the field of vision of a pair of photosensitive cells.

FIG. 7g shows the sum of the signals of the 6 demodulated photosensitive cells of each one of the LPUs of the same eye 1130. The LPU selected is the one of which the sum is the maximum and of which at least one of the neighbouring sums is greater than a threshold (represented by a dotted line).

FIG. 7h shows the output of the corresponding ZSL depending on the position of the contrast. ZSL provides as output the index of the LPU that satisfies the 2 selection criteria.

FIG. 7i shows the static characteristics (7i (a), (b), (c), (d), (e)) identified for the different LPUs of an eye 1130 comprising 6 photosensitive cells. The crosses represent the boundaries of the selected area for building the calibration table. FIG. 7i (f) shows the output signal of the ZSL which gives the index of the pair to be selected, advantageously a 0 index reflects the fact that the contrast is not seen by any LPU.

FIG. 7d shows the response of an eye once the LPUs are merged for a contrast moving as a ramp in front of the eye. This figure therefore shows the actual response of an eye 1130 merged for a sweep from −16° to +16° at 1.67°·s$^{-1}$. The actual position of the contrast is represented by a dotted line. The application of the calibration table and FFT post-processing allows to obtain the filtered measurement as a continuous line, which shows that the output is perfectly confounded with the actual position, proving the reliability of the different calibration tables obtained by the calibration phase.

According to an embodiment, and in the case of a contrasted target 1112 having an edge contrast, the output of the LPU according to the position of the contrast is described by the following function:

$$\tanh\left(\Psi_c \frac{4\Delta\phi\ln(2)}{\Delta\rho^2}\right)$$

where $\psi_c$ is the angular position of the contrast.

As the output is monotone on the interval $$\left[-\frac{\Delta\phi}{2}; +\frac{\Delta\phi}{2}\right],$$

it is possible to use a calibration table to trace the actual angular position of the contrast edge.

Likewise, for a contrasted target 1112 comprising a bar that has a sufficiently large subtended angle, the output of the optical sensor is strictly monotonous on $$\left[-\frac{\Delta\phi}{2}; +\frac{\Delta\phi}{2}\right],$$

making it possible through the use of a calibration table (depending on the subtended angle) to raise the position of the bar:

$$\frac{\left|e^{\frac{\Psi_c(t)\Delta\phi}{2\sigma^2}} \cdot \sinh\left(\frac{\alpha}{2\sigma^2}\left(\Psi_c(t) - \frac{\Delta\phi}{2}\right)\right)\right| - \left|e^{-\frac{\Psi_c(t)\Delta\phi}{2\sigma^2}} \cdot \sinh\left(\frac{\alpha}{2\sigma^2}\left(\Psi_c(t) + \frac{\Delta\phi}{2}\right)\right)\right|}{\left|e^{\frac{\Psi_c(t)\Delta\phi}{2\sigma^2}} \cdot \sinh\left(\frac{\alpha}{2\sigma^2}\left(\Psi_c(t) - \frac{\Delta\phi}{2}\right)\right)\right| + \left|e^{-\frac{\Psi_c(t)\Delta\phi}{2\sigma^2}} \cdot \sinh\left(\frac{\alpha}{2\sigma^2}\left(\Psi_c(t) + \frac{\Delta\phi}{2}\right)\right)\right|} \quad \text{With: } \sigma = \frac{\Delta\rho}{2\sqrt{2\ln(2)}}$$

The merger between the local measurement of the various LPUs can then be achieved by adding simply an offset, corresponding to the position of the selected LPU. The choice of the LPU being obtained through the index delivered by the ZSL detector.

Figure 8A:
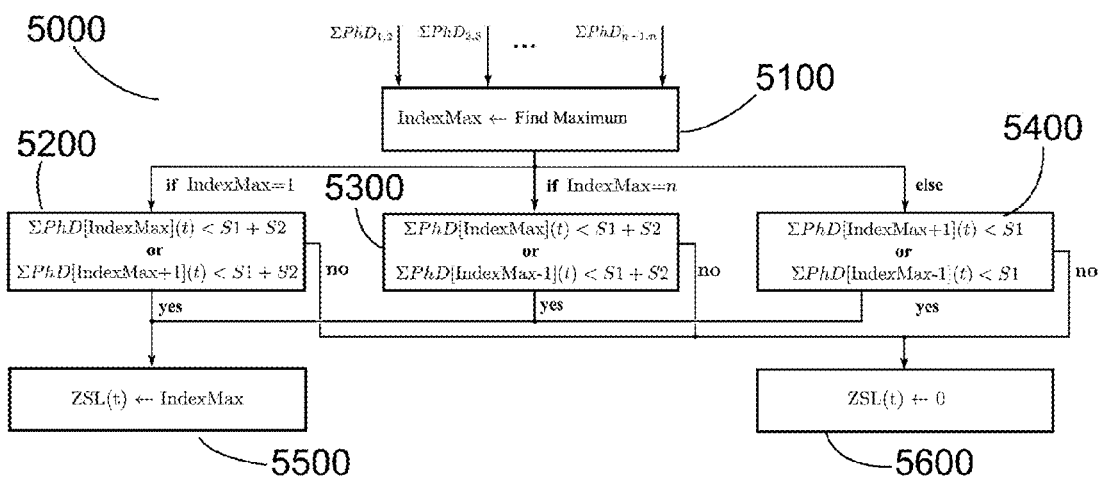
FIGS. 8a and 8b show two algorithms, according to an embodiment of this invention, for processing optical signals.

FIGS. 8a and 2b show, according to an embodiment of this invention, two signal processing algorithms.

FIG. 8a shows the algorithm that makes it possible to choose the best LPU. Each LPU sees a contrast if the sum of the demodulated signals is above a certain threshold and if a neighbouring LPU also sees a contrast, and finally if the maximum amount is greater than a certain threshold. It is this threshold superiority which is shown by the algorithm of FIG. 8a.

The algorithm of FIG. 8a corresponds to the search for the best LPU, i.e. the one of which the sum is the highest. Each LPU is then studied according to its "index", i.e. its number. For example, the index 1 corresponds to the LPU comprised of the first and second photosensitive cells 1041 and 1042. According to the index of the LPU with the largest sum, this algorithm makes it possible to identify it.

According to an embodiment, a calibration phase is necessary to establish a table of correspondence between raw of each LPU and the actual position of the contrast.

Due to the difficulty of knowing precisely the optical parameters of the eyes 1130 and to reproduce these settings identically for each eye 1130, a calibration method was developed. In addition, all the photosensitive cells having a different response to the same light intensity, it is imperative to accurately calibrate this invention.

Indeed, in practice it is very difficult to obtain identical optical properties Δφ and Δρ for each photosensitive cell, making the response of each pair different from the others for the same bar or the same contrast edge. Likewise, the amplitude response of the various photosensitive cells varies which causes a loss of insensitivity to light.

This invention therefore provides an automatic calibration algorithm in order to overcome this problem and to make it possible to render the combined output of the sensor perfectly linear.

The procedure is as follows, it is sufficient to very slowly rotate (with the angular velocity Ω defined by the following equation:

$$\left(\Omega < \frac{\frac{4}{40}}{\frac{20\Delta\phi}{F_{mod}}}\right)$$

rotates on itself against the contrast to be characterised. During characterisation, for each LPU the demodulated signal $Ph_{1_{dem}}(t)$ and $Ph_{2_{dem}}(t)$ must be recorded as well as the angular position θ(t) of the contrast with respect to the sensor.

According to a particularly advantageous embodiment, the calibration method is an automatic method. This method consists of operating the eye face with a contrast to be characterised. During characterisation, each LPU is recorded, as well as the actual position of the contrast with respect to the eye.

Then, the following steps are performed:
Standardisation of the demodulated signals in order to obtain insensitivity to ambient lighting. For this, for example, the maximum of each of the responses of the photosensitive cells is identified in order to derive therefrom a scaling factor for standardisation.
Calculation of the output signal $Si_{LPU}$ of each pair.
Determining the pair to be selected thanks to the criterion of the ZSL detector.
Calculating the filtered output signal $Si_{LPU}$ without delay of each pair. Filtering without delay is done through a fast Fourier transform (FFT). Fast Fourier Transform). The filter cut-off frequency $f_c$ corresponds to the highest frequency that makes it possible to obtain a monotonous output $S_f(t)$ on the portion where the pair is selected, it is therefore suitable to:
Compute the FFT of the output signal, $S_{FFT}(\omega) = FFT(S_{LPU}(t))$
Filter the output signal in the spectral range, $S_{FFT\_f}(\omega) = S_{FFT}(\omega) * 1/\sqrt{(1+\omega/\omega W_c)}$ with ω=2πf: the frequency vector used for the FFT and $\omega_c=2\pi f_c$.
Switch back to the temporal range, $S\_f(t) = iFFT(S_{FFT\_f}(\omega))$
Search the local minimum (corresponding to the time t_1) and the local maximum (corresponding to t_2 time) of the characteristic, to determine the limits of the table.
Generating the table of correspondence between the measured position of contrast $S_f(t)$ and its actual position θ(t) using the desired precision on the angular measurement as a spatial discretisation of θ(t).
Table: $[\theta(t_1): \Delta\theta(t): \Delta(t_2)] \rightarrow [S_f(t_1): S_f(t_2)]$ According to an embodiment serving as a non-limiting example, an exemplary algorithm is illustrated by FIG. 8a. The detection system 1100 comprises $n_n$ eyes 1130 where n is a multiple of 4 for example. This invention makes it possible to determine the angular position of the target 1112 relative to the detection system 1100, i.e. the angle ψ reflecting its orientation in the yaw, also called the "cap", with the angle Φ corresponding to the angular position of the target on the roll axis and the angle θ on the pitch axis, the axes of roll and pitch being orthogonal with each other and with the yaw axis. An orthonormal coordinate $(O, \vec{x}, \vec{y}, \vec{z})$ is defined such that O is the center of the circle on which are arranged the n eyes 1130, $\vec{x}$ is pointing to a first eye, the eye 1, and $\vec{y}$ to a second eye: the eye n/4. This invention therefore makes it possible to derive local measurements of each of the n eyes 1130, the angular position of the detection system 1100 with respect to the target 1112. In this approach, it is assumed that the detection system 1100 is already located more or less above the target 1112, i.e. that at least two separate branches of the contrasted target 1112 can be seen by at least two eyes 1130 each. The use of b branches however contains a limitation on the measurement of the angle ψ, which cannot be estimated as a modulo $$\left[\frac{\pi}{b}\right].$$

This follows from the fact that the targets 1112 are constructed by symmetry of rotation, of angle $$\frac{\pi}{b}.$$

Figure 8B:
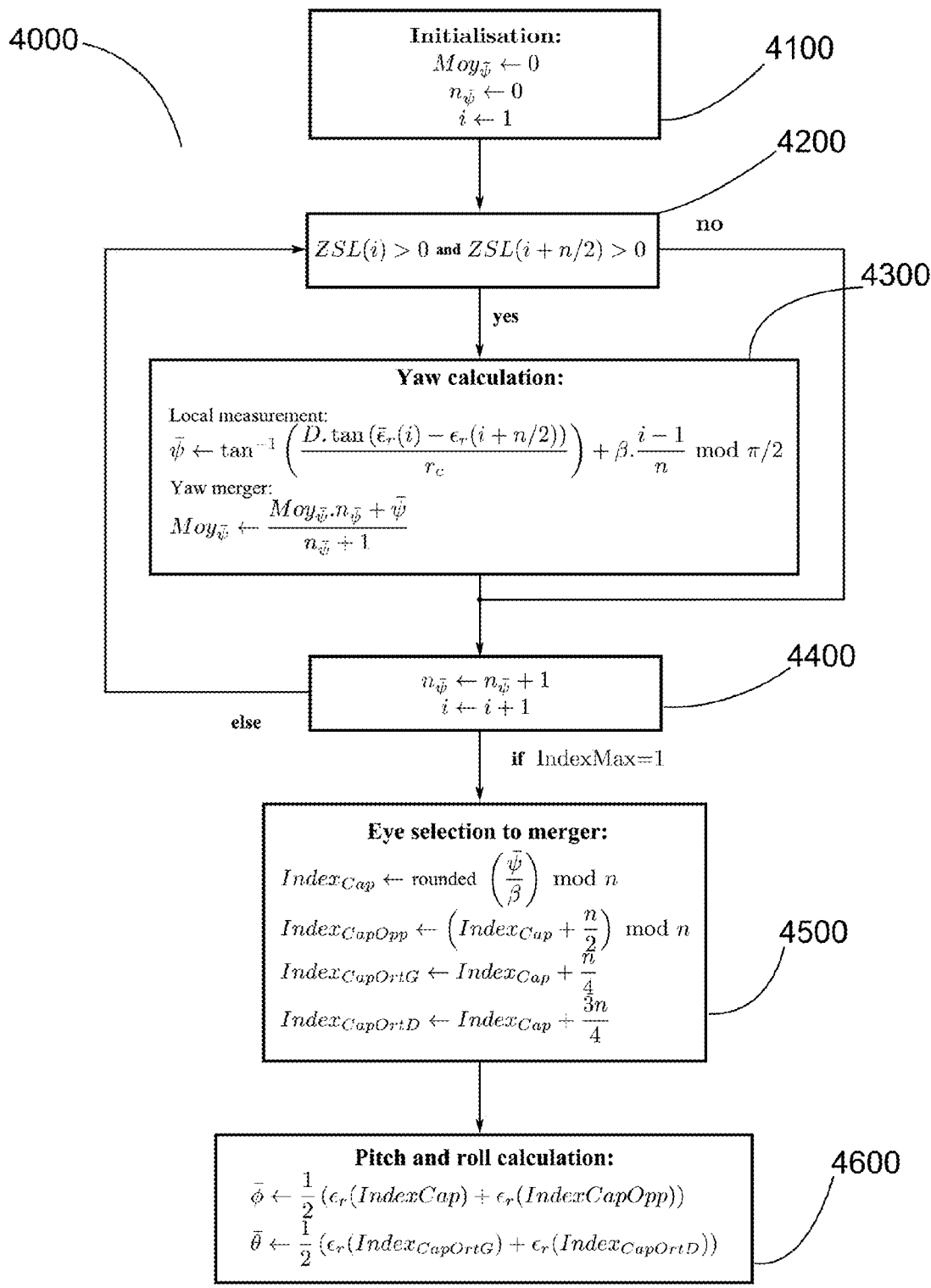

According to an embodiment and in the case where the detection system is composed of n eyes 1130, with n a multiple of 4. The determination of the relative angular position of the detection system with respect to the target begins by determining the angle ψ of lace, with all of the eyes seeing one of the branches of the target 1112. Once this specific angle is determined, the heading of the target 1112 compared to that of the detection system 1100 is calculated, i.e. the index $Index_{Cap}$ corresponding to the eye 1130 being best aligned with the target 1112. The angles Φ and θ are determined using the eyes:

$$Index_{Cap} + k \cdot \frac{n}{2b}$$

where k∈ℕ |1<k<n/2. As such the angular position of the detection system 1100 with respect to the target 1112 may be determined by the algorithm shown in FIG. 8b.

According to an embodiment, the method of determining the relative angular position of the detection system 1100 with respect to the contrasted target comprises the following steps of:
determining the yaw angle ψ using all of the eyes 1130 having in their field of view one of the branches of the two-dimensional contrasted target.
determining a first eye 1130 being best aligned with the target 1112
determining of angles Φ and θ using eyes 1130 able to detect the target 1112 in directions different from that of the first eye 1130.

Figure 9:
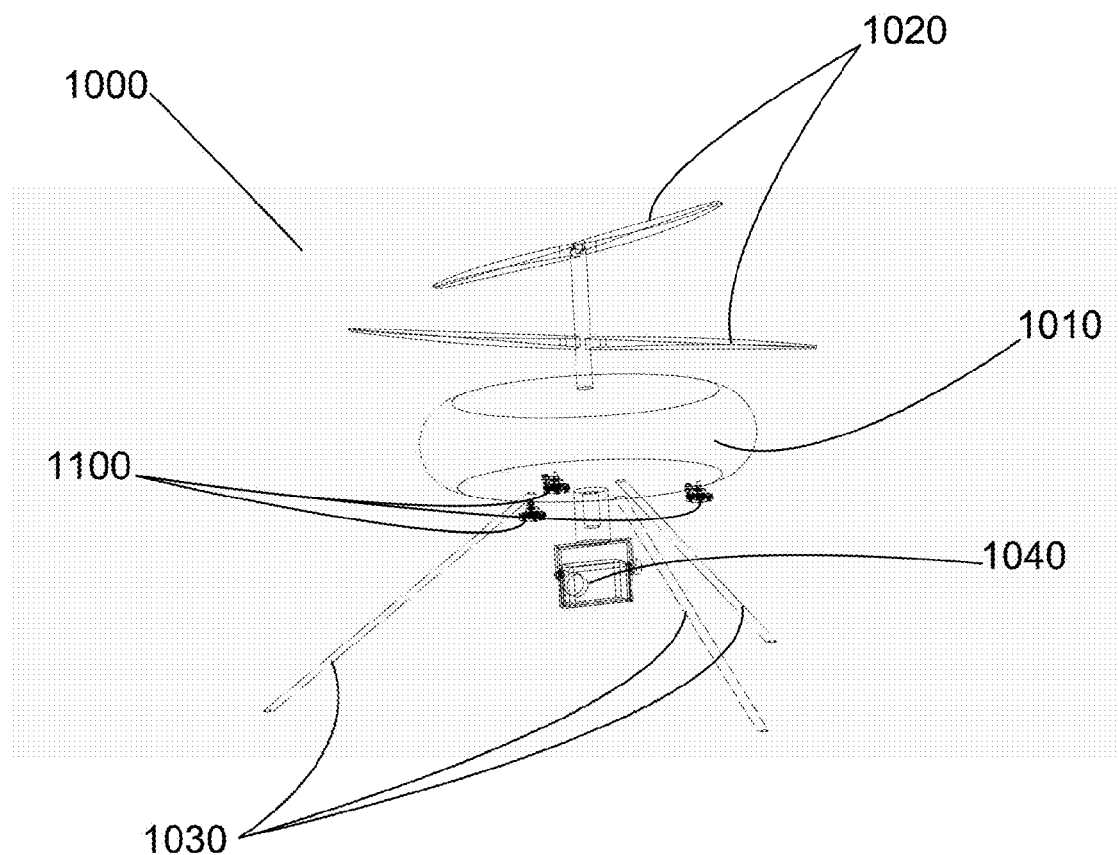
FIG. 9 shows an embodiment of this invention.

FIG. 9 shows an embodiment of this invention in which a drone comprising means for three-dimensional movement is equipped with 3 detection systems 1100 comprising 4 eyes 1130 each. These 3 detection systems are arranged uniformly around a high-resolution camera 1040.

Figure 10A:
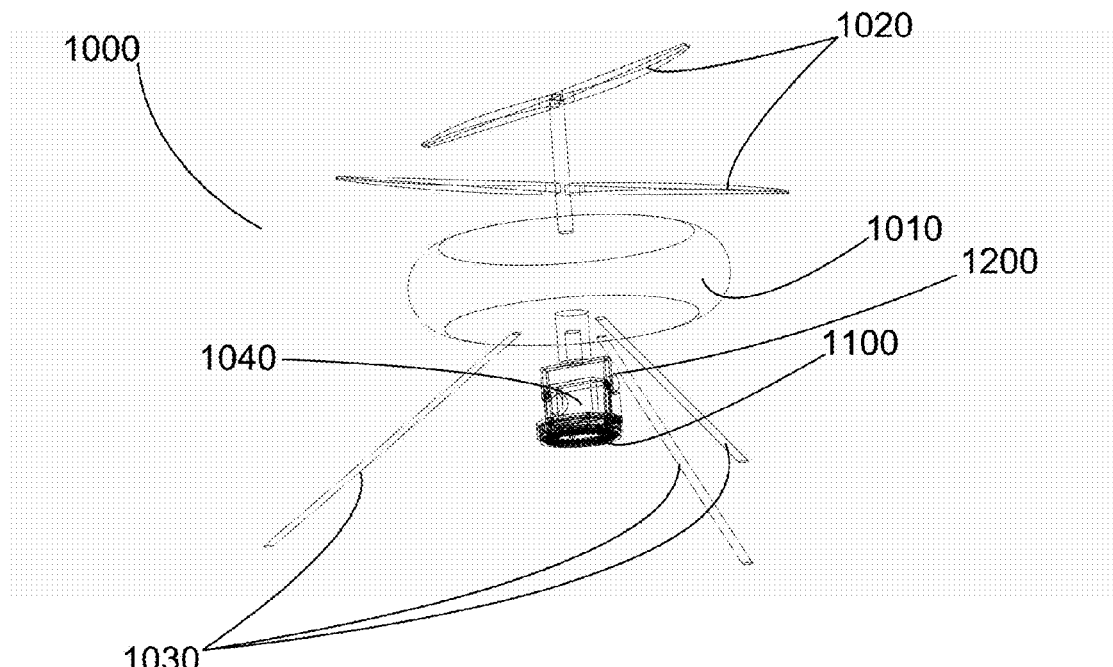
FIGS. 10a and 10b show a second embodiment of this invention.
Figure 10B:
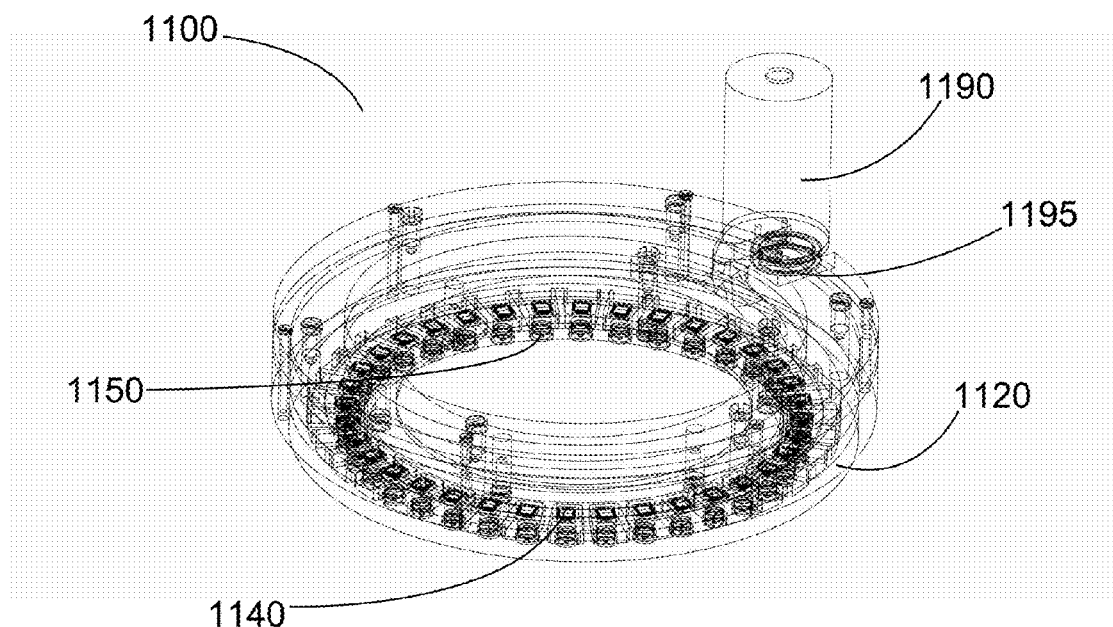

FIGS. 10a and 10b show a particularly advantageous embodiment of this invention.

FIG. 10a shows a mounting alternative of the detection system 1100 on a drone 1000 with coaxial counter-rotating rotors. The detection system 1100 may be mounted on a gyro-stabilized platform 1200 so as not to undergo rotations of pitch and roll of the drone 1000.

FIG. 10b shows an example of configuration in which the detection system 1100 comprises a multitude of eyes 1130 mounted on a support where a ball bearing of large diameter permits rotation of the part supporting the optics 1150 relative to the part supporting the optical sensors 1140. As such the eccentric mechanism 1190 allows to apply the same periodic optical micro-scanning movement resulting from a micro-translation of the optics 1150 with respect to their respective optical sensors 1140.

This invention therefore proposes, as it has been exposed in this description, to determine the relative position of a detection system 1100 with respect to a contrasting target 1112 using a plurality of eyes 1130 and an optical scanning generated by an unique actuator 1190. This then makes it possible to have a better synchronisation on the optical scans, since they are all at the same frequency, increased reliability because an unique actuator 1190 is required per detection system 1100 and a substantial energy savings since the weight is optimised, also the volume and finally the signal processing method does not require high energy consumption.

According to an embodiment, this invention can also be used in the field of mobile robotics such as for the positioning of robots with respect to a target.

This invention allows, for example, a mobile robot 5000 and resting by gravity on a support to straighten its heading and to position itself perpendicularly to a contrasted target 5500.

Figure 11A:
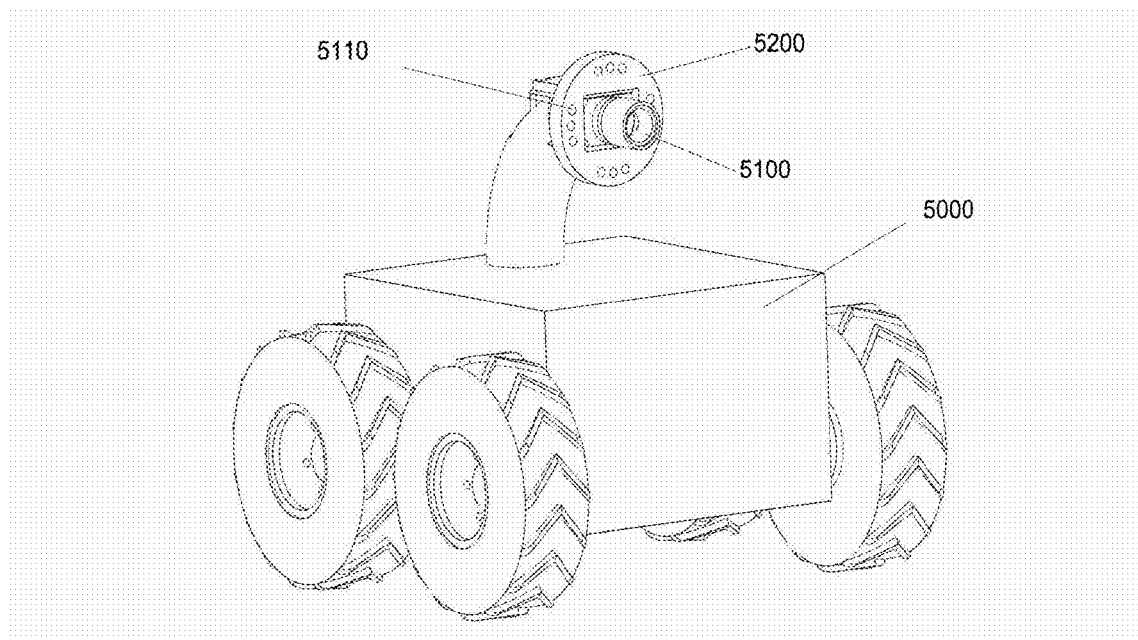
FIGS. 11a and 11b show an embodiment of this invention suitable for mobile robots.
Figure 11B:
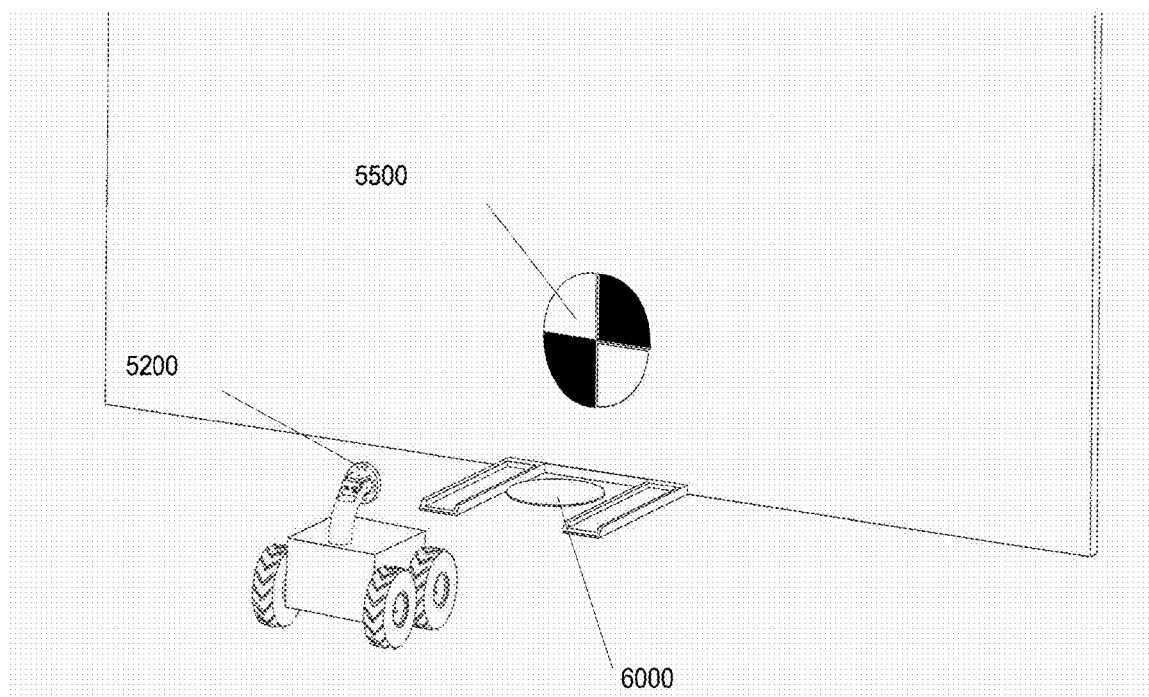

FIGS. 11a and 11b show an example of positioning of a mobile robot 5000 provided with a camera 5100 and a detection system 5200 according to this invention mounted coaxially with respect to the camera 5100 and comprising elementary eyes 5110. This configuration enables the mobile robot 5000 to lock its course towards the contrasted target 5500. In FIG. 11b, this contrasted target 5500 is a marker with four quadrants used as a landmark for the locating of the induction charging station.

Advantageously, if the contrasted target 5500 is held centerd in the visual field of the detection system 5200 during the approach of the mobile robot 5000 whether or not holonomic through a feedback loop on the heading of the moving robot 5000, then the mobile robot 5000 will be automatically positioned with great precision on the charging station 6000.

The detection system 5200 according to this invention makes it possible to provide a fine measurement of the angular position of the contrasted target 5500 without mobilising additional computational resource and with very few pixels. The number of pixels may be between 1 and 1000, advantageously between 2 and 500 and preferably be equal to 12. In order to stop the mobile robot 5000 above the recharging station 6000, a travel sensor 6100 is located above the recharging station 6000. Alternatively there is provided a proximity meter, of the infrared and/or ultrasound type to detect the approach with respect to the wall where the contrasted target 5500 is located.

Advantageously, it is possible to have two contrasted targets separated by a known distance, so as to measure by triangulation the distance of the mobile robot 5000 with respect to the plane supporting the contrasted targets. FIG. 4i is a non-limiting example of this situation.

The invention is not limited to the embodiments described hereinabove and extends to all embodiments covered by the claims.

The invention claimed is:

1. A system for detecting a contrasted target having at least one contrast zone said detection system is wherein:
    the system comprises at least one first and one second optical devices each comprising:
        at least one optical system with a focal plane, an optical center and an optical axis perpendicular to the focal plane and passing through the optical center, at least one optical sensor comprising a plurality of photosensitive cells; said at least one plurality of photosensitive cells is positioned with respect to said at least one optical system so that the light beams transmitted by said at least an optical system are received by said at least one plurality of photosensitive cells;
    the optical systems of the at least first and second optical devices are integral with each other and are supported by a first support;
    the optical sensors are integral with each other and are supported by a second support;
    the first support and the second support are configured to be driven in relative rotation with respect to each other;
    said relative rotation is performed according to an axis of rotation parallel to the optical axes of the optical systems of the at least first and second optical devices, with the rotation axis being different from said optical axes of the optical systems;
    a unique actuator is configured to generate said relative rotation;
    said relative rotation is performed according to a scanning angle, said scanning angle and the distance between the optical center of the at least one optical system of each optical device and the axis of rotation of said relative rotation are configured so that for each of the at least one optical sensor of the at least one first and one second optical devices, as said relative rotation takes place, for each optical device the optical center of the at least one optical system associated with the at least one optical sensor carries out a scan of a plurality of photosensitive cells of the at least one optical sensor;
    the at least one first and second optical devices are positioned with respect to said axis of rotation so that said scanning of the optical centers of the optical systems is conducted to a first direction for the at least a first optical device and in a second direction, different from the first direction, for the at least one second optical device.

2. The system according to claim 1 configured so that said relative rotation comprises an oscillatory rotational movement that is periodic.

3. The system according to claim 1 wherein the dimensions and configuration of optical devices, in particular the size of the photosensitive cells and the distance between the axis of relative rotation and the optical center of the at least one optical device are configured such that each optical sensor perceives the scan as a translational movement.

4. The system according to claim 1 configured so that the relationship which links the distance R between said axis of relative rotation and the optical center of the at least one optical systems, with the distance d' travelled by the optical center and with the distance d between two adjacent photosensitive cells of the plurality of photosensitive cells, when scanning an optical sensor by said optical center, is expressed by the following equation:

$$d' = R\tan\left(\frac{d}{R}\right)$$

and wherein R>>d, advantageously R>k·d with k=10 and preferably k=100, so that d'≈d.

5. The system according to claim 1 wherein the unique actuator is an eccentric motor configured to generate said relative rotation comprising an oscillating rotational movement that is periodic.

6. The system according to claim 1 wherein for at least one optical device, the plurality of photosensitive cells is positioned outside the focal plane of the at least one optical systems.

7. The system according to claim 1 configured so that the light beams received by the plurality of photosensitive cells have a Gaussian distribution of their light intensity.

8. The system according to claim 1 wherein the optical devices are distributed around a circle or a ring centered on the axis of rotation.

9. The system according to claim 8 wherein the system includes a video recording device positioned at the center of the circle or the ring on which the optical devices are distributed.

10. The system according to claim 1 wherein all the photosensitive cells of the optical devices are scanned.

11. The system according to claim 1 wherein a distance separates the rotation axis from the optical axes.

12. The system according to claim 1 wherein all the photosensitive cells of at least one plurality of photosensitive cells are scanned in a single movement.

13. The system according to claim 1 wherein the scanning angle of said relative rotation is less than or equal to the angle defined by a first straight line passing through the axis of rotation and by a photosensitive cell disposed at a first end of the optical sensor and by a second straight line passing through the axis of rotation and through a photosensitive cell arranged at a second end of the optical sensor.

14. The system according to claim 3 wherein said translational movement is carried out according to different directions for each of the optical devices.

15. The system according to claim 1 wherein the photosensitive cells comprise at least one photodiode, advantageously at least two, and wherein the wavelength of detection of at least one photodiode is between 400 nanometers and 1000 micrometers.

16. The system according to claim 1 wherein the plurality of photosensitive cells comprises photosensitive cells configured for detecting radiation according to identical wavelengths.

17. The system according to claim 1 wherein the at least one plurality of photosensitive cells comprises photosensitive cells configured to detect radiation by of different wavelengths from each other.

18. The system according to claim 1 wherein the unique actuator is configured to rotate the first support integral with the optical systems, with the second support being held fixed with respect to a frame of the system.

19. A mobile device according to at least two spatial directions comprising a system according to claim 1 and configured to adjust its position along the at least two spatial directions according to a detection made by said system.

20. The mobile device according to claim 19 wherein the at least two spatial directions are orthogonal to each other.

21. A drone comprising at least one system according to claim 1 and configured to adjust its spatial position in function of a detection performed by said system.

22. A mobile robot comprising at least one system according to claim 1 and configured to adjust its spatial position in function of a detection performed by said system.

23. An assembly comprising at least one mobile device according to claim 19, or at least one drone according to claim 21, or at least one robot according to claim 22, and at least one contrasted target, the mobile device, or drone, or the mobile robot being configured to adjust its spatial position depending on its relative position with respect to the contrasted target detected by said system.

24. A method for calibrating a system according to claim 1, with respect to determining a plurality of pairs of adjacent photosensitive cells for each optical device;
    filtering of an output signal S of each one of said pairs of the plurality of pairs of adjacent photosensitive cells;
the method also comprising the following steps:
    for a plurality of known positions of the detection system with respect to the contrast zone, recording of said known position and of the filtered output signal S of each one of said pairs of the plurality of pairs of adjacent photosensitive cells corresponding to said known position;
    generating of a table of correspondence between the known position of the detection system with respect to the contrast zone and the filtered output signal S of each one of said pairs of the plurality of pairs of adjacent photosensitive cells corresponding to said known position.

25. A method for determining the position of a system according to claim 1, with respect to a contrasted target comprising a contrast zone, by using a table of correspondence generated by the method of calibration according to the preceding claim, with the method comprising the following steps implemented by computer:
    determining a plurality of pairs of adjacent photosensitive cells for each optical device;
    filtering of an output signal S of each one of said pairs of the plurality of pairs of adjacent photosensitive cells;
the method also comprising the following steps:
    measuring of a filtered output signal S of each one of said pairs of the plurality of pairs of adjacent photosensitive cells;
    reading in the correspondence table of the position of the detection system with respect to the contrast corresponding to said filtered and measured signal S.

* * * * *